United States Patent
Mower et al.

(10) Patent No.: US 7,570,196 B1
(45) Date of Patent: Aug. 4, 2009

(54) APPARATUS, METHOD, COMPUTER PROGRAM PRODUCT AND SYSTEM PROVIDING ASYNCHRONOUS TRANSMISSION OF COMMUNICATIONS DATA USING TIME-GATED TECHNIQUES

(75) Inventors: Vaughn L. Mower, Bountiful, UT (US);
Larry S. Thomson, Bountiful, UT (US);
David H. Robbins, Bountiful, UT (US);
James J. Boesch, Cottonwood Heights, UT (US)

(73) Assignee: L-3 Communications Corporation, New York, NY (US)

( * ) Notice: Subject to any disclaimer, the term of this patent is extended or adjusted under 35 U.S.C. 154(b) by 67 days.

(21) Appl. No.: 11/799,342

(22) Filed: May 1, 2007

(51) Int. Cl.
*G01S 13/00* (2006.01)

(52) U.S. Cl. ............... 342/57; 342/59; 342/159; 342/198

(58) Field of Classification Search .......... 342/19, 342/40–51, 57, 59, 60, 73, 82, 89, 94, 165, 342/159, 198; 370/201, 280, 294; 375/138, 375/347, 351, 354; 455/63.1, 500, 512, 516
See application file for complete search history.

(56) References Cited

U.S. PATENT DOCUMENTS

| | | | | |
|---|---|---|---|---|
| 3,808,598 | A * | 4/1974 | Carter | 342/456 |
| 4,010,468 | A * | 3/1977 | Fishbein et al. | 342/59 |
| 4,517,568 | A * | 5/1985 | Willmore | 342/14 |
| 4,818,998 | A * | 4/1989 | Apsell et al. | 342/444 |
| 5,955,984 | A * | 9/1999 | Schober et al. | 342/159 |
| 6,975,683 | B2 | 12/2005 | Mower et al. | 375/259 |
| 7,321,611 | B2 * | 1/2008 | Fullerton | 375/219 |
| 7,453,391 | B1 | 11/2008 | McIntire et al. | 342/57 |

FOREIGN PATENT DOCUMENTS

WO    WO98/53337    * 11/1998

* cited by examiner

*Primary Examiner*—Thomas H Tarcza
*Assistant Examiner*—Peter M Bythrow
(74) *Attorney, Agent, or Firm*—Harrington & Smith, PC

(57) ABSTRACT

A method, computer program product, apparatus and system are provided. In one exemplary embodiment, a method includes: receiving at a second unit periodic energy bursts transmitted by a first unit; blanking a transmitter of the second unit in accordance with the received periodic energy bursts such that the transmitter is unable to transmit when the second unit is receiving a periodic energy burst; and transmitting a plurality of instances of a same data from the second unit to the first unit.

25 Claims, 16 Drawing Sheets

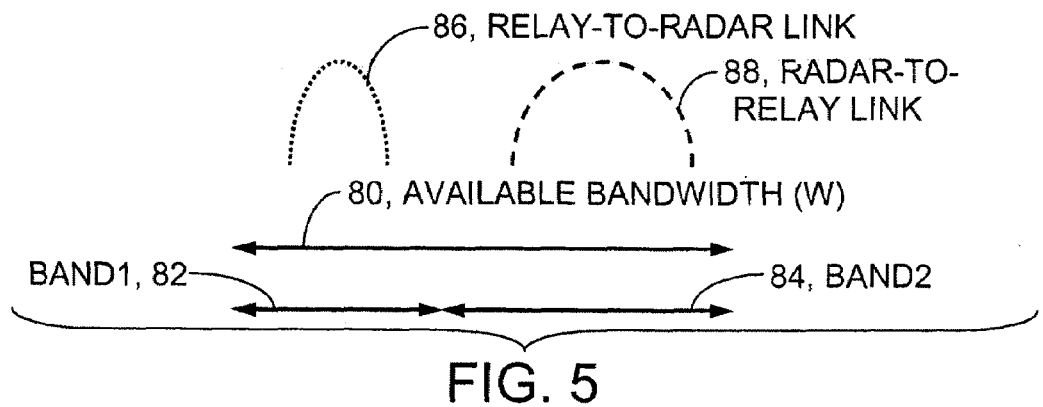
FIG. 5
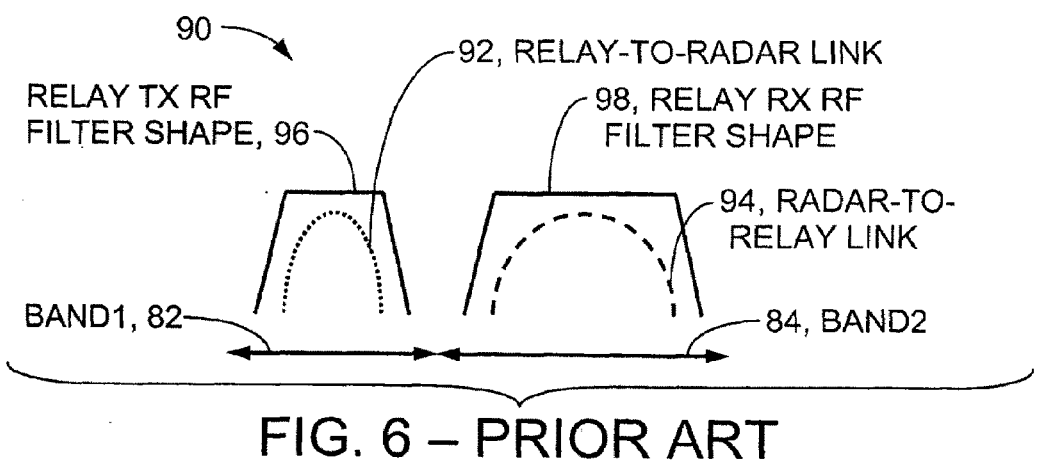
FIG. 6 – PRIOR ART
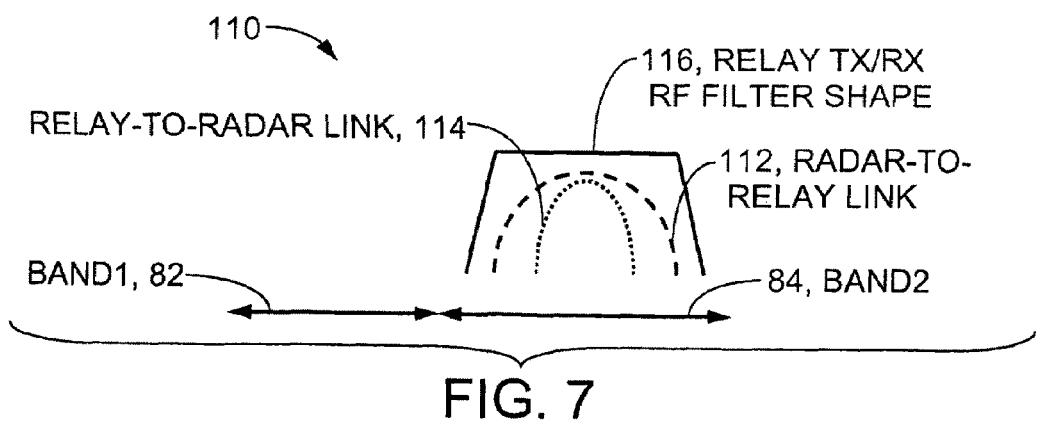
FIG. 7

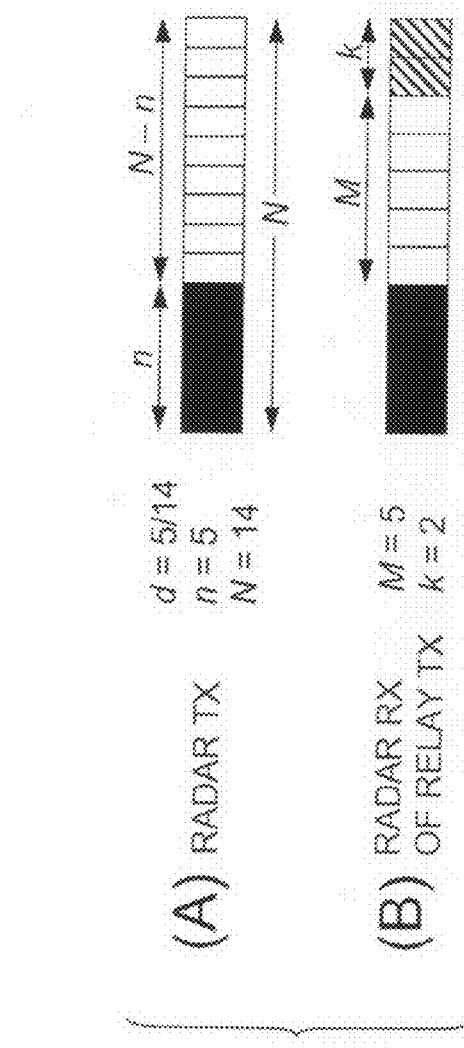
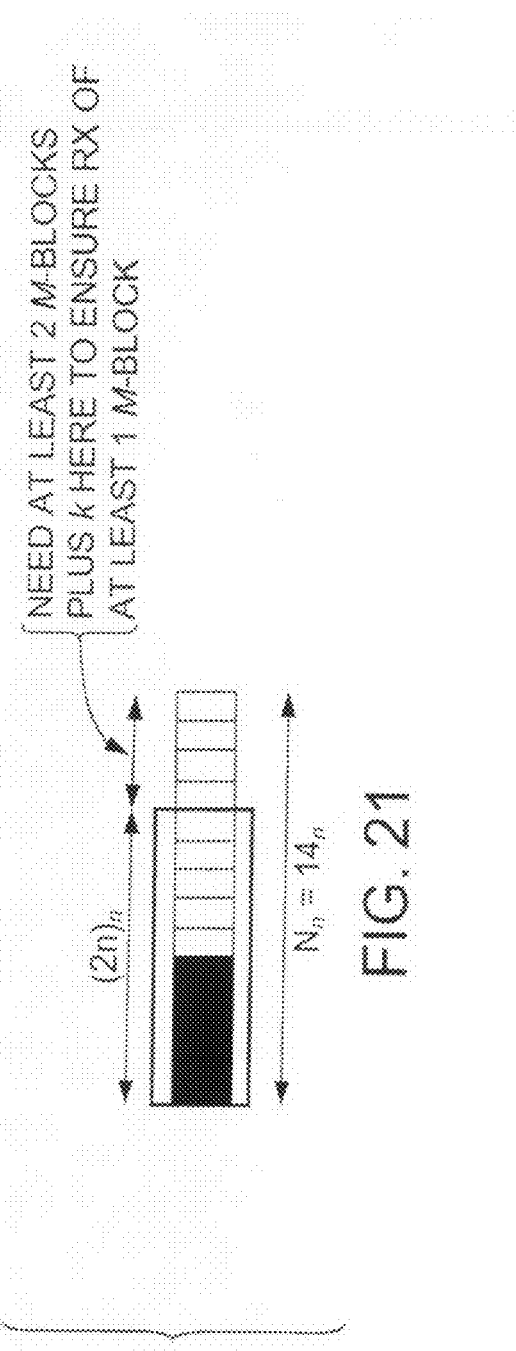
FIG. 20
FIG. 21

US 7,570,196 B1

APPARATUS, METHOD, COMPUTER PROGRAM PRODUCT AND SYSTEM PROVIDING ASYNCHRONOUS TRANSMISSION OF COMMUNICATIONS DATA USING TIME-GATED TECHNIQUES

TECHNICAL FIELD

The teachings in accordance with the exemplary embodiments of this invention relate generally to wireless communication systems and, more specifically, relate to asynchronous transmission of communications data to a periodically-blanked radar receiver using shared radio frequency (RF) spectrum time-gated techniques.

BACKGROUND

In conventional frequency division access techniques, the available communications bandwidth is shared among different communication links (e.g., users) by allocating different portions (e.g., channels or bands) of the bandwidth using a plurality of carrier frequencies. In a pure frequency division access system (i.e. a system only employing frequency division access techniques), although multiple users can utilize the system, each channel or band can only support one user at a time. Thus, the number of coincident users (e.g., connections) is limited, at least in part, by the available bandwidth and the number of bands into which the bandwidth is divided.

SUMMARY

In an exemplary aspect of the invention, a method includes: receiving at a second unit periodic energy bursts transmitted by a first unit; blanking a transmitter of the second unit in accordance with the received periodic energy bursts such that the transmitter is unable to transmit when the second unit is receiving a periodic energy burst; and transmitting a plurality of instances of a same data from the second unit to the first unit.

In another exemplary aspect of the invention, a computer program product is provided. The computer program product includes program instructions embodied on a tangible computer-readable medium. Execution of the program instructions results in operations including: receiving at a second unit periodic energy bursts transmitted by a first unit; blanking a transmitter of the second unit in accordance with the received periodic energy bursts such that the transmitter is unable to transmit when the second unit is receiving a periodic energy burst; and transmitting a plurality of instances of a same data from the second unit to the first unit.

In a further exemplary aspect of the invention, an electronic device is includes: a receiver configured to receive periodic energy bursts transmitted by another electronic device; a transmitter configured to transmit a plurality of instances of a same data to the other electronic device; and a data processor coupled to the receiver and the transmitter, wherein the data processor is configured to blank the transmitter in accordance with the periodic energy bursts received by the receiver such that the transmitter is unable to transmit when the receiver is receiving a periodic energy burst.

In another exemplary aspect of the invention, a system includes: a first electronic device having a first transmitter coupled to a first data processor and a first receiver coupled to the first data processor, wherein the first transmitter is configured to transmit periodic energy bursts; and a second electronic device having a second receiver configured to receive said periodic energy bursts, a second transmitter configured to transmit a plurality of instances of a same data to the first electronic device, and a second data processor coupled to the second receiver and the second transmitter, wherein the second data processor is configured to blank the second transmitter in accordance with the periodic energy bursts received by the second receiver such that the second transmitter is unable to transmit when the second receiver is receiving a periodic energy burst.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 5 depicts the available bandwidth (W) 80 that will be considered in the implementations of FIG. 6-9;

FIG. 6 illustrates a conventional full-duplex implementation;

FIG. 7 shows an exemplary implementation utilizing aspects of the exemplary embodiments of the invention;

FIGS. 20A and 20B illustrate exemplary radar transmission and radar reception of relay transmissions for $d=\frac{5}{14}$ and $M=7$, respectively, where the relay transmission pattern has a "dead time" k;

FIG. 21 illustrates the third criterion in relation to the exemplary system described above wherein the radar duty cycle (d) is 5/14 and where the relay transmission pattern has a "dead time" k;

DETAILED DESCRIPTION

It would be beneficial to provide a communication method and system that enables more efficient utilization of the RF frequency spectrum than may be available in a pure frequency division access system. The exemplary embodiments of the invention enable one or more users to reuse or time share the frequency spectrum by providing precision time-gating of transmitted and/or received signals. This enables the transmitted and received signals to occupy the same frequency band on a time-shared basis. This utilization of the frequency band is generally more efficient and enables higher data rates than might otherwise be possible in a pure frequency division access system.

Figure 1:
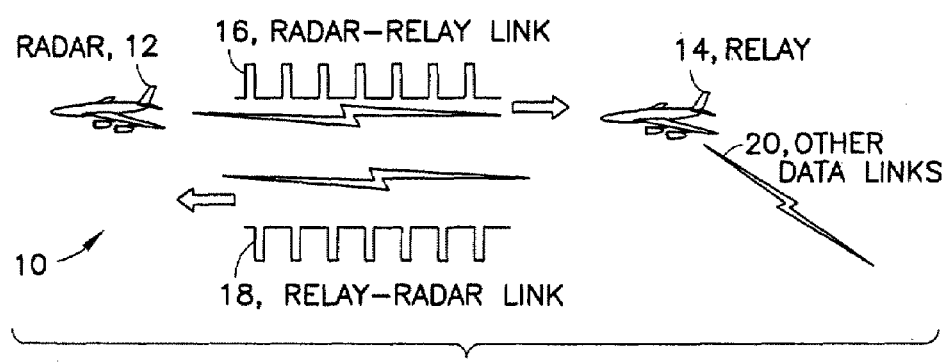
FIG. 1 shows an exemplary radar-relay communications system that is suitable for use in practicing the exemplary embodiments of the invention.

Referring to FIG. 1, an exemplary radar-relay communications system 10 is shown that is suitable for use in practicing the exemplary embodiments of the invention. Although the exemplary embodiments of the invention are herein shown and described with respect to a radar communication system, the exemplary embodiments of this invention may be employed in conjunction with any suitable communications system utilizing any suitable communications method, standard or constituent components.

In FIG. 1, two aircraft 12, 14 are shown. One aircraft (Radar; also referred to herein as the Radar platform) 12 is using the radar for communications transmissions to the other aircraft (Relay; also referred to herein as the Relay platform) 14 which is serving as a relay platform. There are separate communication links 16, 18 between the two aircraft 12, 14. The Radar-Relay link 16 (also referred to herein as the Radar-to-Relay link) is used for transmissions from the Radar 12 to the Relay 14. The Relay-Radar link 18 (also referred to herein as the Relay-to-Radar link) is used for transmissions from the Relay 14 to the Radar 12. Both communications links to/from the Radar 12 and Relay 14 platforms are pulsed. There may be other data links 20 to/from the Relay platform 14, as shown. The below discussion of the exemplary embodiments of the invention focuses on the Relay-to-Radar link 18 and the sharing of the RF spectrum for both Radar-to-Relay 16 and Relay-to-Radar 18 links although the exemplary embodiments of the invention are not limited thereto.

Due to the nature of the system and communications methods employed, the radar is unable to transmit and receive data at the same time. That is, while it is transmitting data, the radar is unable to receive data. Any and all signal reception by the radar must occur at a time in which the radar is not transmitting. Thus, it is important to account for the periodic blanking of the radar receiver, for example, by synchronizing clocks and arranging transmissions such that the radar platform receives transmissions from the relay platform and the two platforms can communicate with one another. As an example, the radar-relay system would not adequately function if the relay only transmitted data to the radar platform when the radar platform was transmitting its data.

As an additional example of a suitable technique, reference may be made to commonly-assigned U.S. Pat. No. 7,453,391, issued to McIntire et al. on Nov. 18. 2008 (filed Nov. 3, 2006). Therein, another exemplary technique is described whereby a radar receiver can receive communications from a relay. The relay transmits a burst of data a plurality of times to ensure that the radar transceiver receives at least one of the bursts. The length of an individual burst is less than half of the interval between successive radar transmissions (the inter-burst interval). In such a manner, one can ensure that the radar receives at least one of the relay bursts without requiring that the relay have knowledge of the radar's transmission timing (e.g., inter-burst interval timing). This exemplary technique is in contrast to the exemplary embodiments described below wherein the relay utilizes the timing of the radar transmissions, for example, to form a blanking pulse for blanking the transmitter of the relay.

Figure 2:
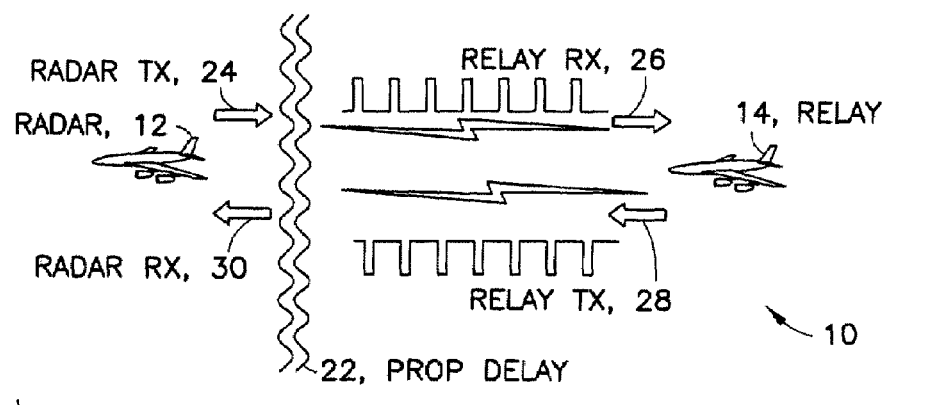
FIG. 2 depicts the exemplary radar-relay communications system of FIG. 1 with the effects of propagation delay illustrated.

FIG. 2 depicts the exemplary radar-relay communications system 10 of FIG. 1 with the effects of propagation delay 22 illustrated. That is, the signals sent between the radar platform 12 and the relay platform 14 are offset in time (e.g., a time delay) due, at least in part, to time delays based on distance of propagation. The amount of the time offset may vary based on diverse factors, including factors that are determinable (e.g., distance) and ones that are arbitrary. Thus, in discussing the exemplary embodiments of the invention, it is useful to refer to and compare the transmitted signals (TX) and received signals (RX) for the radar 12 and relay 14.

As a non-limiting example of the effects of propagation delay on a system utilizing aspects of the exemplary embodiments of the invention, consider FIG. 2. The radar platform 12 transmits a burst pattern (radar TX) 24. The radar TX 24 experiences a time shift based on an arbitrary propagation delay 22. Thus, the signal (relay RX) 26 received by the relay platform 14 is time-shifted as compared with the radar TX 24. The relay platform 14 transmits a signal (relay TX) 28 to the radar platform. Similar to the above-noted time shift, the signal (radar RX) 30 received by the radar platform 12 is time-shifted as compared with the relay TX 28.

Since the radar platform 12 is unable to transmit and receive at the same time and signals sent to the radar platform 12 by the relay platform 14 may be time-shifted due to one or more propagation delays 22, it would be useful to employ methods, computer program products or apparatus that enable a reference unit (e.g., the radar platform) to reliably receive signals from another unit (e.g., the relay platform). The exemplary embodiments of the invention provide precision time-gating of transmitted and/or received signals to ensure that, given a reference burst pattern of a reference signal transmitted by a reference unit, a second signal can be transmitted by a second unit in a manner such that the reference unit will be able to receive the second signal.

Figure 3:
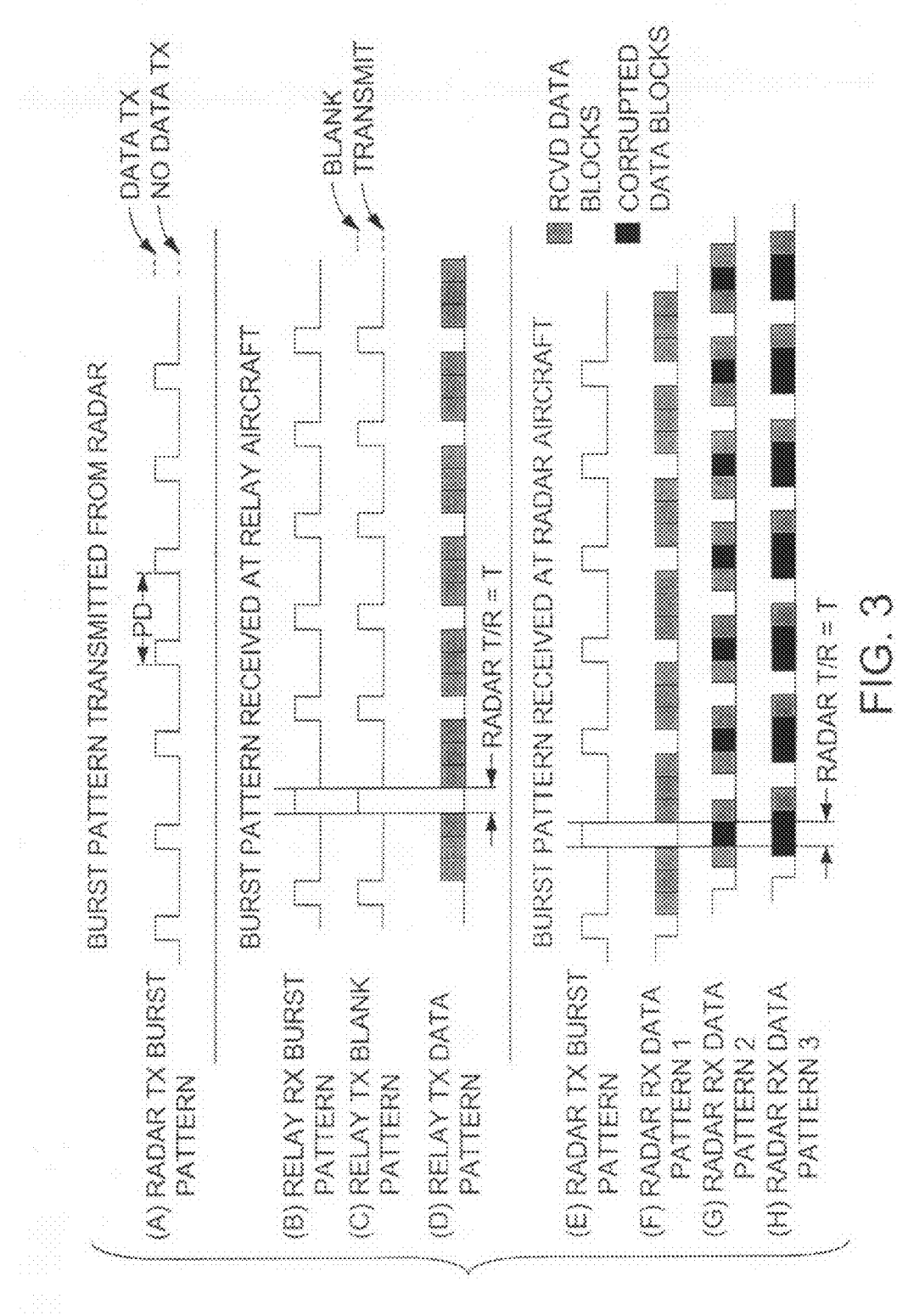
FIG. 3 shows an exemplary timing diagram that is suitable for use in practicing the exemplary embodiments of the invention.

Referring to FIG. 3, an exemplary timing diagram is shown that is suitable for use in practicing the exemplary embodiments of the invention. In FIG. 3, the radar burst(s) has a duty cycle (i.e. a ratio of on-time to off-time). The duty cycle of the exemplary radar burst in FIG. 3 is 1/4 (i.e. 25%). That is, the radar transmits data one-fourth of the time (i.e. one-fourth on-time, three-fourths off-time). In other embodiments and systems, the radar may have a duty cycle greater than or less than 1/4. The duty cycle and various aspects thereof are explained below, with respect to FIGS. 10-22.

Each of the seven patterns shown and identified in FIG. 3 will be considered and discussed below. Although not otherwise indicated in FIG. 3, the seven patterns share a common horizontal axis corresponding to time. For example, a vertical line across a portion of FIG. 3 indicates various signal patterns at a same instance in time.

(A) The radar burst pulse envelop (radar TX) is shown. During the data transmit (DATA TX) time (on-time), communications data is transmitted. At other times (NO DATA TX; off-time), no data is transmitted. The transmitted data include sync pulses to synchronize clocks of the radar and relay platforms. The exemplary radar burst transmission pattern has a period (PD) of 75 microseconds. This period is, for example, only to quantify the short burst durations. In other embodiments and systems, burst durations may be shorter or longer (i.e. have a different period). In further embodiments, the transmitted data may not include sync pulses and a different method or technique may be used to synchronize the clocks. In other embodiments, the two units may not use clocks and, instead, may employ other methods or techniques to ensure correct timing.

(B) This pattern depicts the transmitted pulse as received by the relay (relay RX). As is apparent, the received burst pattern is delayed in time (i.e. time-shifted or time-delayed) as compared to the radar TX (A). As noted above in the discussion of FIG. 2, the time delay may be arbitrary and, thus, the radar TX may arrive at the relay receiver at an arbitrary phase relationship when referenced to the radar TX.

(C) The relay times a blanking pulse to the relay transmitter to precisely blank the relay transmitter during the received time interval (i.e. relay RX). This blanking of the relay transmitter may be useful, for example, in allowing the relay transmission equipment to cool off during the blanked interval, in allowing the relay transmission equipment to consume less power due to the off-time of the blanked interval or in enabling a system wherein the radar and relay transmissions share a same bandwidth (e.g. by using time division multiplexing, TDM). The received time interval may be known precisely following the first received pulse of the radar TX if the time relationship of the received sync pattern to the next received pulse is already known (i.e. the exact number of received symbol clocks is known). Propagation delays due to cables can be easily compensated for by including a programmable delay register in the relay received data deformatter (see FIG. 4). In practice, the relay transmitter pulsing can be controlled within a time uncertainty on the order of, for example, 200 nanoseconds, which includes the rise/fall time of presently available traveling wave tube or solid state amplifiers. The time uncertainty of the relay transmitter pulsing may comprise a value greater than or less than 200 nanoseconds.

(D) This shows a typical relay data transmission pattern (relay TX). Each group of three represents re-transmission of identical data (i.e. the same data is transmitted three times in a row). As will be shown below, only one of the three transmitted pulses will be reliably received. If more than one such pulse is received by the radar (radar RX), the duplicate packet(s) is discarded at the radar receiver. Each packet may include an identifier or other such indication to enable the identification of duplicate packets.

(E) This is a duplicate of pattern (A) and is shown to emphasize that when the radar transmitter is actively transmitting, data cannot be received from the relay. This is because, for example, the radar Transmit/Receive (T/R) switch is in the "T=Transmit" position.

The next three patterns (F, G, H) provide three examples of how the data burst transmitted from the relay (relay TX; (D)) can be received at the Radar (radar RX; (F, G, H)) in relationship to the transmitted pulse from the Radar (radar TX; (E)). Note that a corrupted data block is one that the radar does not receive due to the fact that at least a portion of the reception time of the corrupted data block coincides with the radar T/R=T (radar data transmit time). Thus, the radar does not receive at least a portion of each corrupted data block.

(F) Radar RX data pattern 1 illustrates the case where all three duplicate data blocks/frames from the relay happen to fall within the time window when the radar T/R=R. In this case, all three duplicate packets are received. Two of these data packets will be discarded, as discussed previously.

(G) Radar RX data pattern 2 illustrates the case where only the second (center) data block transmitted from the relay falls within the time window when the radar T/R=T, and is thus not received at the radar. Of the two received data packets, only one packet will be used and/or saved.

(H) Radar RX data pattern 3 illustrates a more typical case where two of the three data packets are corrupted and only one of the three data packets is received. As is apparent, the timing is such that there will always be at least one data packet received by the radar receiver.

Thus, utilizing aspects of the exemplary embodiments of the invention, the reference unit (e.g., the radar platform) should be capable of receiving at least one data block transmitted to it by another unit (e.g., the relay platform), as shown in FIG. 3.

Although described above with respect to a radar Transmit/Receive (T/R) switch, in other embodiments, and as a non-limiting example, software may control which function (TX or RX) of the radar is currently active and/or selected.

Although described herein with respect to a pulsed reference signal, in other embodiments the reference signal may not comprise a pulsed signal. As a non-limiting example, the reference signal may comprise information indicative of the times during which the reference unit is capable of receiving incoming signals. As a further non-limiting example, such information may comprise timing values as coordinated between the reference unit and the second unit or as pre-established during manufacturing or initialization of the two units.

Figure 4:
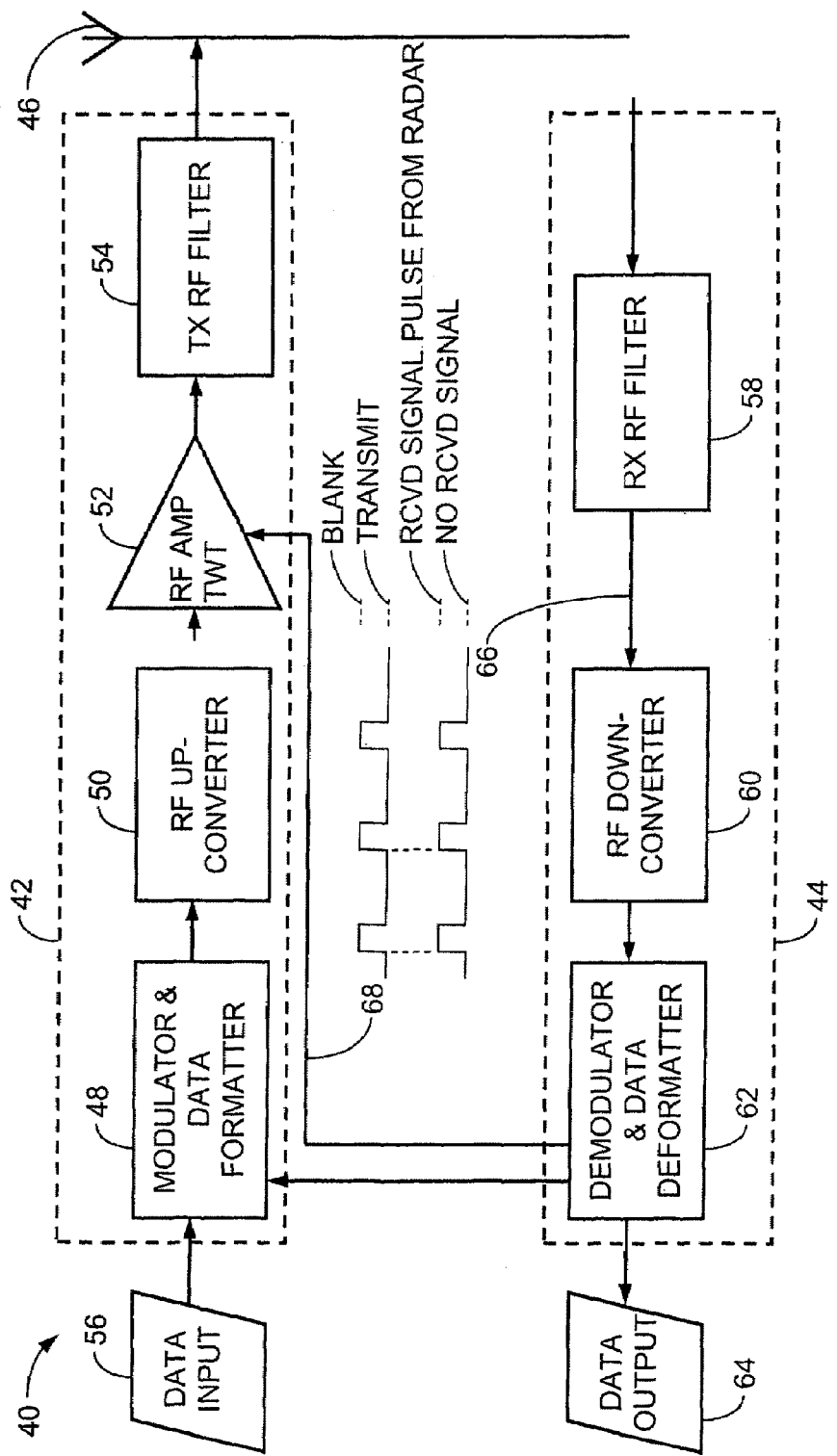
FIG. 4 shows an exemplary system block diagram for a relay platform having a transmitter and a receiver.

Referring to FIG. 4, there is shown an exemplary system block diagram for a relay platform having a transmitter and a receiver. The exemplary system 40 of FIG. 4 is illustrative of a typical implementation, though other embodiments may comprise different configurations including different components and/or a different arrangement of components.

The system 40 includes a transmitter 42 and a receiver 44, both coupled to a common antenna 46. Although the exemplary system 40 includes only one antenna 46 used in conjunction with a diplexer, other embodiments may use a plurality of antennas and/or other antenna configurations. Furthermore, other embodiments may comprise a transceiver, the transceiver having at least one transmitter and at least one receiver.

The transmitter 42 comprises a Modulator & Data Formatter 48, a RF Up-converter 50, a RF amplifier/traveling wave tube (RF AMP TWT) 52 and a Transmit RF filter 54, arranged in sequential order, as shown in FIG. 4.

The transmitter 42 functions as herein described. The Modulator & Data Formatter 48 receives the data input 56 and generates pulsed data for transmission to the radar, including synchronization pulses for use at the radar receiver. The RF Up-converter 50 then performs frequency translation/conversion to convert the intermediate frequency (IF) signal to the transmitted radio frequency (RF) signal. The RF AMP TWT 52 amplifies the RF signal while also confirming that the correct timing is being utilized. The Transmit RF filter (TX RF filter) 54 limits transmitted spectral emissions to acceptable levels. The signal (Relay TX) is then transmitted via the antenna 46.

The receiver 44 comprises a Receive RF filter 58, a RF Down-Converter 60 and a Demodulator & Data Deformatter 62.

The receiver 44 receives a signal (Relay RX) via the antenna 46. The received signal is input to the Receive RF filter (RX RF filter) 58 which filters any noise or undesired signals (e.g., false receptions). The RF Down-Converter 60, using frequency translation/conversion, converts the RF signal to an IF signal. The IF signal is sent to the Demodulator & Data Deformatter 62 where it is processed to obtain the data output 64 and the synchronization pulses. The synchronization pulses are sent to the Modulator & Data Formatter 48 and the RF AMP TWT 52.

The signal 66 sent from the RX RF filter 58 to the RF Down-Converter 60 is shown. The signal 66 shown corresponds to a received pulse train as from a Radar platform, for example. Each cycle of the signal 66 comprises a period where a signal pulse is received from the Radar (Rcvd signal pulse from radar) and a period without a received signal pulse (no Rcvd signal). As explained herein, the Relay cannot transmit at the same time it is receiving.

The signal 68 sent from the Demodulator & Data Deformatter 62 to the RF AMP TWT 52 is also shown. This signal 68 reflects the blanking pulse for the transmitter 42 that ensures that the transmitter 42 does not transmit when the receiver 44 is receiving a signal. As is made more apparent when the two signals 66, 68 are compared, the transmitter 42 is blanked at the appropriate times, thus enabling the exemplary system 40 to function in accordance with the exemplary aspects of the invention as discussed herein.

The beginning of the transmitted data pulses/frames is synchronized following reception of the first received pulse from the radar. In addition, the RF blanking pulse to the RF Amplifier/TWT is synchronized in the same fashion. Hardware delays are compensated for in digital logic to correctly synchronize the transmitted data frames with the blanking pulse utilizing timing as was previously discussed.

Synchronization of the transmitted data and blanking may be performed, for example, continually on a pulse-to-pulse basis following reception of the first data burst from the radar. This method provides real-time timing updates to automatically compensate for oscillator drift and Doppler frequency, for example. In other embodiments, synchronization may be performed on a different frequency (e.g., every other pulse).

In other embodiments, after the blanking pulse has been established for the relay transmitter, the relay, a component thereof or a component related thereto (e.g. connected to the relay or in communication with the relay) may subsequently check the blanking pulse timing and adjust the blanking pulse if necessary. This may be useful, for example, due to changing conditions in the transmission medium between the radar and the relay.

In further embodiments, the system 40 may comprise one or more data processors (not shown) coupled to the transmitter 42 (e.g., to the Modulator & Data Formatter 48) and the receiver 44 (e.g., to the Demodulator & Data Deformatter 62). In other embodiments, the at least one data processor may be coupled to at least one memory (not shown). The at least one memory may include program instructions that, when executed by the associated at least one processor, enable the device to function in accordance with the exemplary embodiments of the invention. In other embodiments, the at least one processor may perform some or all of the functions shown in FIG. 4 as being performed by the transmitter 42 or the receiver 44.

The exemplary embodiments of this invention may be carried out by computer software implemented by at least one data processor or by hardware, or by a combination of hardware and software. As a non-limiting example, the exemplary embodiments of this invention may be implemented by one or more integrated circuits. The at least one memory may be of any type appropriate to the technical environment and may be implemented using any appropriate data storage technology, such as optical memory devices, magnetic memory devices, semiconductor-based memory devices, fixed memory and removable memory, as non-limiting examples. The at least one data processor may be of any type appropriate to the technical environment, and may encompass one or more of microprocessors, general purpose computers, special purpose computers and processors based on a multi-core architecture, as non-limiting examples.

The system 40 of FIG. 4 may be embodied in an electronic device. The electronic device may comprise a portable computer, a communication device or a mobile communication device, as non-limiting examples. The electronic device may comprise a mobile electronic device having a power supply, such as a rechargeable battery or a solar cell, as non-limiting examples.

Further reference with regard to two-way coherent radio communication methods and systems, including constituent components thereof and arrangement of such components, may be made to commonly-assigned U.S. Pat. No. 6,975,683 to Mower et al. titled "Radio Frequency Burst Interference Mitigation."

Figure 8:
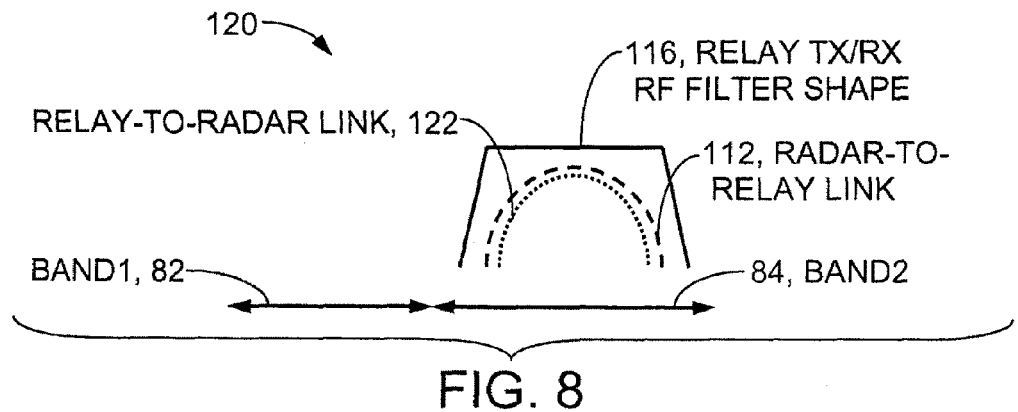
FIG. 8 illustrates another exemplary implementation utilizing aspects of the exemplary embodiments of the invention.
Figure 9:
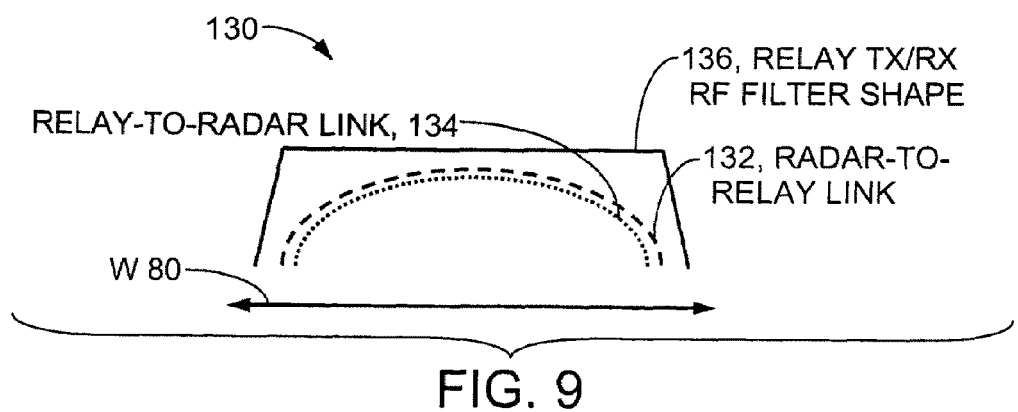
FIG. 9 depicts another exemplary implementation utilizing aspects of the exemplary embodiments of the invention.
Figure 10:
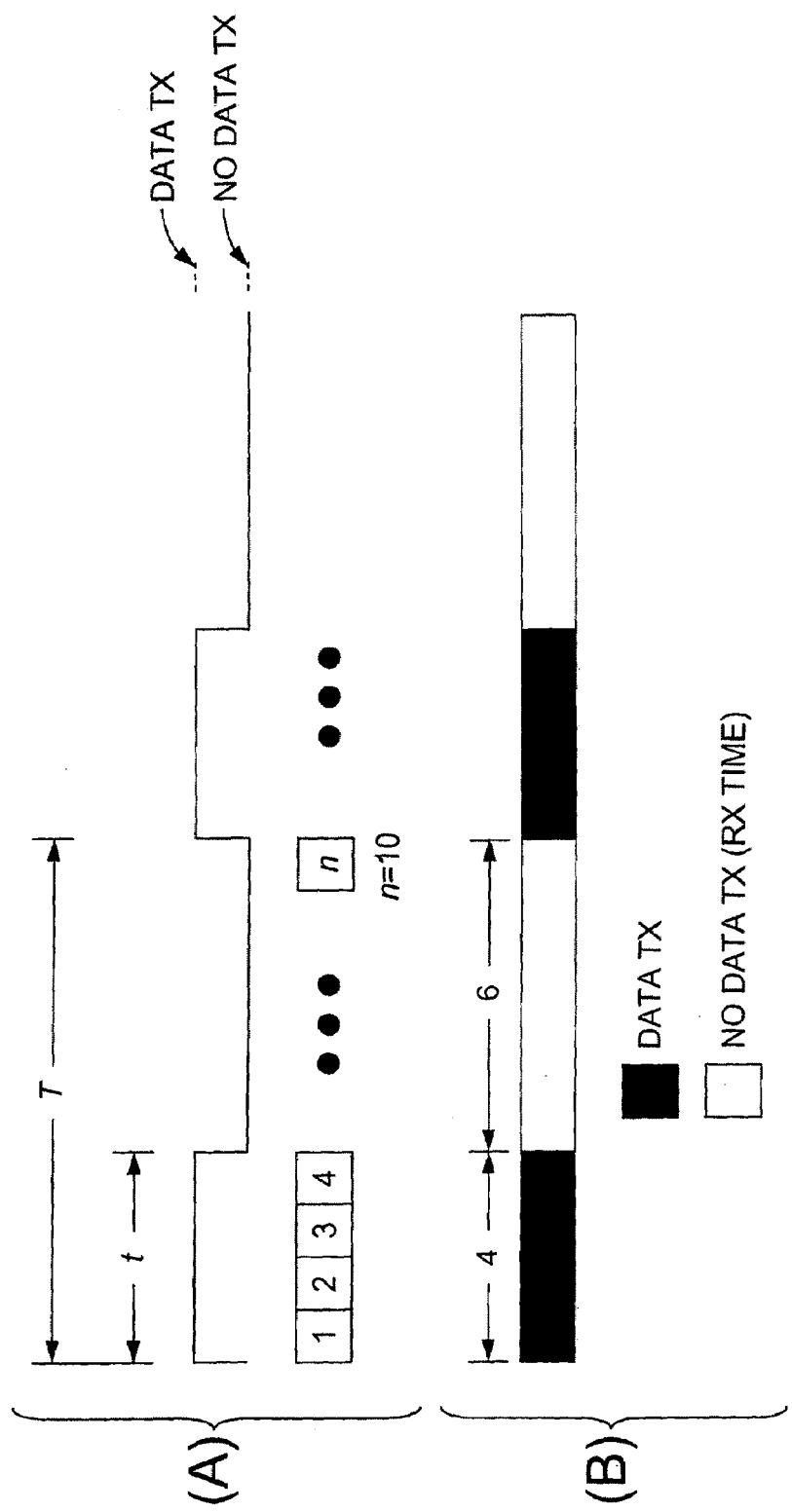
FIGS. 10A and 10B show timing detail for an exemplary radar transmission.

FIGS. 5-9 illustrate several possible implementations for frequency band utilization, including three implementations employing aspects of the exemplary embodiments of the invention (FIGS. 7-9). These implementations will be considered in order to explore some of the potential benefits available based on use of the exemplary embodiments of the invention.

In the implementations shown in FIGS. 5-9, the Radar-to-Relay link has a wider or larger bandwidth than the Relay-to-Radar link. In other embodiments, the Relay-to-Radar link may have a wider bandwidth than the Radar-to-Relay link. In further embodiments, the two links may have approximately the same bandwidth coverage. The bandwidths shown in FIGS. 5-9, for the bands, communication links and filters, are merely illustrative.

FIG. 5 depicts the available bandwidth (W) 80 that will be considered in the implementations of FIGS. 6-9. W 80 comprises two sub-bands or bands 82, 84, namely BAND1 82 and BAND2 84. The bandwidth being discussed may be represented by indicating either W 80 or the combination of BAND1 82 and BAND2 84.

Also shown in FIG. 5 are two communication links 86, 88. A first communication link (Relay-to-Radar Link; i.e. the dotted arc) 86 comprises the link for communications transmitted from the relay and received by the radar. A second communication link (Radar-to-Relay Link; i.e. the dashed arc) 88 comprises the link for communications transmitted from the radar to the relay. The use of either or both bands 82, 84 will be indicated by illustrations shown above the bands. For example, in FIG. 5, link 86 is above BAND1 82 and link 88 is above BAND2 84. Thus, the Relay-to-Radar link 86 uses the indicated portion of BAND 182 for its communications. Similarly, the Radar-to-Relay link 88 utilizes the indicated portion of BAND2 84 for its communications. In FIGS. 6-9, the communications links 86, 88 will be shown using the same line-style (e.g., dotted arc, dashed arc) as in FIG. 5.

Referring to FIG. 6, a conventional full-duplex implementation 90 is shown. Using the conventional implementation 90 of FIG. 6, it is possible to have continuous transmission and reception of RF signals. As in FIG. 5, the Relay-to-Radar link 92 uses BAND1 82 and the Radar-to-Relay link 94 uses BAND2 84. As such, the Relay TX RF filter frequencies have a certain "shape" 96 to ensure that the relay can transmit on the portion of the bandwidth used by the Relay-to-Radar link 92. In a similar manner, the Relay RX RF filter covers certain frequencies according to a "shape" 98 to ensure that the relay can receive on the portion of the bandwidth used by the Radar-to-Relay link 94.

In the relay, the received pulsed signal would be demodulated and received as explained above. In the implementation of FIG. 6, the signal transmitted by the relay could be continuous. For this conventional implementation, the frequency band used by or dedicated for the Relay-to-Radar signal (e.g., the Relay-to-Radar link 90) is assumed to be smaller, which results in a smaller transmitted data rate given equivalent modulation types for the transmitted and received signals.

Note that although the implementation in FIG. 6, as described above, is referred to as a conventional full-duplex implementation 90, a similar implementation may be utilized with the exemplary embodiments of the invention. While in such an implementation the Radar-to-Relay and Relay-to-Radar signals would not share a common bandwidth, the time gating techniques of the exemplary embodiments of the invention may still be utilized. FIG. 6 is described as a conventional implementation in order to contrast other implementations utilizing aspects of the exemplary embodiments of the invention, such as those exemplary implementations shown in FIGS. 7-9, described below.

Referring to FIG. 7, an exemplary implementation 110 utilizing aspects of the exemplary embodiments of the invention is shown. The implementation 110 uses the time-gated communications techniques discussed above (see FIGS. 3 and 4) such that the bandwidth or at least a portion thereof (e.g., BAND2 84) can be reused (i.e. time-shared). That is, the transmit and receive signals may now occupy the same bandwidth because the relay transmitter is blanked during the time period when the signal from the radar is received, as discussed previously. Thus, a portion of the frequencies used for the Radar-to-Relay link 112 are reused by the Relay-to-Radar link 114. Because of this reuse, the shape 116 of the Relay RF filters (TX and RX) can be the same for both the TX and RX RF filters.

The center frequency of the transmitted and received signals may be the same, or may be tuned differently as long as they are within the same frequency band (e.g., BAND2 84). Note that the occupied frequency band usage is less than that of the conventional implementation 90 of FIG. 6 due to the fact that the spectra may overlap. That is, in FIG. 7, BAND1 82 is not utilized for either the Radar-to-Relay link 112 or the Relay-to-Radar link 114. In addition, there need not be frequency separation between the transmit and received diplexer filters as is otherwise required for the conventional implementation 90.

FIG. 8 illustrates another exemplary implementation 120 utilizing aspects of the exemplary embodiments of the invention. In the implementation 120, the transmitted signal from the relay 122 (i.e. the Relay-to-Radar link 122) has been widened. This is possible due to the frequency sharing of the transmitted signals and received signals.

FIG. 9 depicts another exemplary implementation 130 utilizing aspects of the exemplary embodiments of the invention. In the implementation 130, the communication links 132, 134 utilize a larger portion of W 80. Accordingly, the Relay TX/RX RF filter shape 136 has been increased. The additional bandwidth is available due to the fact that BAND1 82 was not being used, as apparent in FIGS. 7 and 8. Thus, since both communication links 132, 134 can share the same frequencies, the bandwidth used can be expanded to cover the entirety (or at least a larger portion) of W 80. The implementation 130 shows that even wider bandwidths are achievable for both the transmit and receive signals given that the total occupied bandwidth shown in FIG. 6 is available.

Thus, as can be appreciated from FIGS. 7-9, utilizing aspects of the exemplary embodiments of the invention, it is possible for multiple communication links to time-share a portion of bandwidth (FIG. 7) and for one or more communication links to enjoy a greater bandwidth allocation (FIGS. 8 and 9), thus also enabling a potentially greater throughput (e.g., data rate). In comparing the exemplary implementations of FIGS. 7-9 with the conventional implementation illustrated in FIG. 6, it is apparent that aspects of the exemplary embodiments of the invention can provide significant improvements over conventional techniques and systems.

As noted above, the exemplary embodiments discussed herein may be extrapolated to systems using different radar duty cycles. It should also be noted that the precise time duration and data frame repetition rates of the various bursts may vary due to implementation details including TWT blanking time requirements and other design tolerances of such systems.

While aspects of the exemplary embodiments of the invention are described above with regard to time-sharing of a frequency band, it should be appreciated that the exemplary embodiments are not limited thereto. As a non-limiting example, the exemplary embodiments of the invention may be utilized in the context of a full duplex system utilizing a plurality of frequency bands. In such a case, it still may be desirable to periodically blank the relay transmitter in accordance with the received radar burst, for example, to enable the equipment to cool off or to consume less power. It should be appreciated that the potential benefits of aspects of the exemplary embodiments of the invention are suitable for use in numerous different types of communications systems and environments.

Duty cycle, both in general and as relating to the exemplary embodiments of the invention, will be considered in greater detail below. The duty cycle (d) is defined as the ratio of transmit-time (t) to the total period (T):

$$d = \frac{t}{T} \tag{1}$$

FIGS. 10A and 10B show timing detail for an exemplary radar transmission. The horizontal axis corresponds to time. In FIGS. 10A and 10B, the exemplary radar transmission has a duty cycle (d) of 40% because the radar has a transmit time (t) of four intervals and the period (D) of the transmission is a total of ten intervals (40%=4/10). FIG. 10B depicts the exemplary radar transmission of FIG. 10A utilizing different notation.

It is also useful to define the terms "symmetric" and "asymmetric" (i.e. "non-symmetric") as relating to a radar transmission and a relay transmission. A radar transmission and a relay transmission are herein considered to be "symmetric" when the relay message duration (i.e. a single message transmission time, discounting repetitions of the same message) is equal or substantially close to the radar transmission time (t). A radar transmission and a relay transmission are herein considered to be "asymmetric" or "non-symmetric" when the relay message duration for a single message transmission is not equal or substantially close to the radar transmission time (t).

For example, consider FIG. 3. In FIG. 3, the relay message duration is equal or substantially close to the radar transmission time. Thus, as shown in FIG. 3, the radar transmissions and relay transmissions are symmetric. As another example, if the radar transmitted as shown in FIG. 3 (duty cycle of ¼) but the relay instead transmitted six messages of ⅛ duration, the radar and relay transmissions would be considered asymmetric.

Note that, as shown in FIGS. 3, 10A and 10B, it is useful to divide the period (T) into N equal-duration message intervals. For example, in FIG. 3, the period (T) is divided into 4 equal-duration message intervals (N=4). In FIGS. 10A and 10B, the period (T) is divided into 10 equal-duration message intervals (N=10). Furthermore, based on the N intervals, it is also useful to consider the number of those intervals for which the radar transmits, herein referred to as an integer n. For example, in FIG. 3, the radar transmits for 1 (n) of the 4 (N) intervals. In FIGS. 10A and 10B, the radar transmits for 4 (n) of the 10 (N) intervals. As is apparent, based on the values of n and N, the duty cycle can be determined from or expressed as:

$$d = \frac{n}{N} \quad (2)$$

By comparing equation (2) with equation (1), one can appreciate that n and N are simply a scale for readily measuring or referring to values indicative of t and T, especially as relating to the duty cycle (d). Furthermore, note that a single duty cycle likely has many potential values for corresponding n and N. For example, a duty cycle of d=25% (e.g. the duty cycle shown in FIG. 3) could correspond to n=1 and N=4, to n=2 and N=8 or to n=3 and N=12, as non-limiting examples. For purposes of convenience and consistency, the duty cycle (d) will herein be expressed in terms of n and N as opposed to a percentage. That is, a duty cycle of d=¼, for example, corresponds to values of n=1 and N=4. This notation for d will become more significant in the below discussions, particularly when considering that not all combinations of n and N are permissible (i.e. suitable or usable in light of the exemplary embodiments of the invention) for a given d.

As noted above, while transmitting, the radar is unable to receive. Thus, it is generally desirable for the relay to transmit a same message a number of times in order to ensure that the radar receives at least one of the repeated relay transmissions (see, e.g., FIG. 3 and the above discussion thereof). Let M be the number of duplicate transmissions by the relay. For example, in FIG. 3, the relay transmits the same message 3 times and, thus, M=3.

Note that in the symmetric case, the scale for M is the same as the scale for N. That is, for symmetric cases, a single interval of N is equivalent to a single relay message duration which is a single unit (e.g. interval) of M. In contrast, in the asymmetric case, the scale of N is not the same as the scale of M.

As referred to herein, N and M may be considered to have common scales or be "commonly-scaled" when a single interval of N is equivalent or substantially similar to a single interval of M. Furthermore, N and M may be considered to have different scales or be "diversely-scaled" when a single interval of N is not equivalent or substantially similar to a single interval of M. This difference in scales carries additional significance which is considered more thoroughly below.

It may be desirable to consider the interactions between the duty cycle (d) and values of n, N and M. As such, there are various criteria to consider:

1. The radar cannot receive transmissions from the relay during the radar transmission time (t), which is equivalent to the n intervals.
2. The relay cannot transmit to the radar during the time interval when the relay is receiving data from the radar (e.g. due to blanking of the relay transmitter, as described above).
3. At least two repeated relay messages should be received at the radar in a time interval T−2t to ensure that at least one complete relay message is received by the radar.

The third criterion will be explained in greater detail with respect to FIGS. 11A, 11B and 11C. FIGS. 11A, 11B and 11C illustrate an exemplary system incorporating aspects of the exemplary embodiments of the invention with a radar having a duty cycle of d=¼ (n=1; N=4). The horizontal axis corresponds to time. Assume that the radar and relay communications are time division multiplexed (TDM) over a common, shared frequency band. Note that the transmitter of the relay is blanked in accordance with a blanking pulse timed to the reception, at the relay, of the periodic radar transmissions. Also note that the relay transmits the same message 3 times (M=3). The arrows indicate the first transmission by the radar and the relay, accordingly. The arrows are further indicative of the propagation delays associated with the transmissions. As noted above (see, e.g., FIGS. 2 and 3 and the discussions thereof), the propagation delay is a variable quantity that cannot be determined or known in advance (e.g. the distance between the radar and the relay could be changing because the radar is moving relative to the relay).

FIG. 11A depicts the best scenario wherein the propagation delays are such that the first transmission by the relay arrives immediately after the radar finishes transmitting. As such, all three relay messages are received by the radar and the radar discards two of the repeated messages.

FIG. 11B shows the next best scenario wherein the propagation delays are such that two of the three relay messages are received by the radar. In this case, the radar discards one of the duplicate messages. FIG. 11B clearly shows how, of the 4 intervals (N=4) in the period (T), the radar may not be able to receive for up to two of them (2t). That is, in the worst case scenario, the radar is unable to receive for a portion T−2t of every period (T).

FIG. 11C shows a more common scenario wherein only one of the relay messages is received by the radar. The propagation delays in FIG. 11C are such that, because the relay transmits at least two messages in the time interval T−2t (see, e.g., FIG. 11B), the radar will be able to receive at least one relay transmission.

From FIGS. 11A, 11B and 11C, one can see that the figures primarily illustrate the effect of different propagation delays on the reception by the radar of the relay transmissions. That is, in FIGS. 11A, 11B and 11C, the relay does not change its actions, only the radar reception varies. Thus, in considering potential values of n, N and M, instead of showing and considering both the radar and relay (e.g. as in FIGS. 11A, 11B and 11C), one can simply examine the radar transmissions and receptions. For example, FIG. 12 shows the exemplary radar-relay system of FIG. 11B. As can be seen in FIG. 12, at least two of the relay transmissions (in this case, only two) fit in the time interval T−2t such that the radar will receive at least one relay transmission. Some of the following figures and examples utilize transmission and reception diagrams similar to the one shown in FIG. 12.

Figure 11:
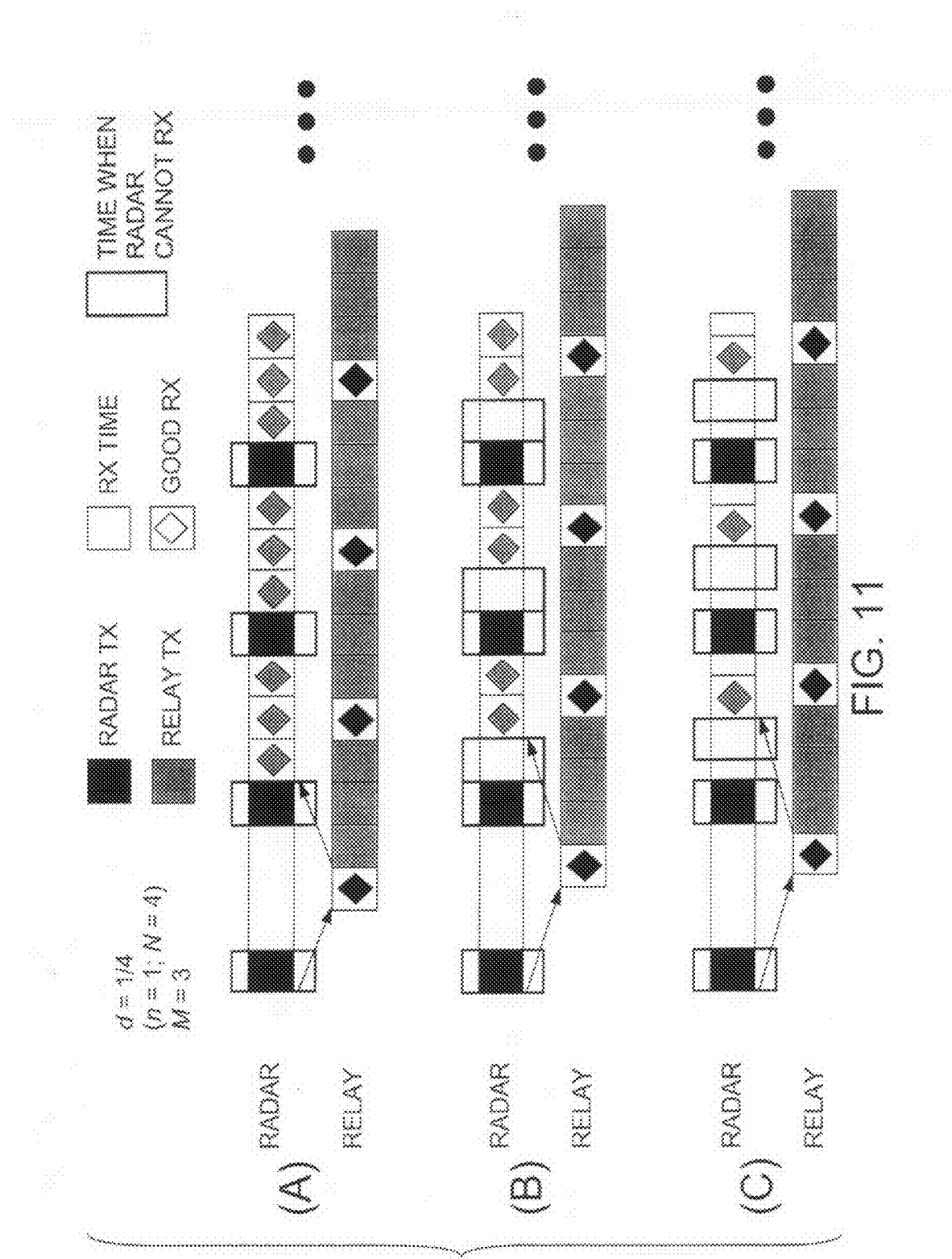
FIGS. 11A, 11B and 11C illustrate an exemplary system incorporating aspects of the exemplary embodiments of the invention with a radar having a duty cycle of $d=\frac{1}{4}(n=1; N=4)$.
Figure 12:
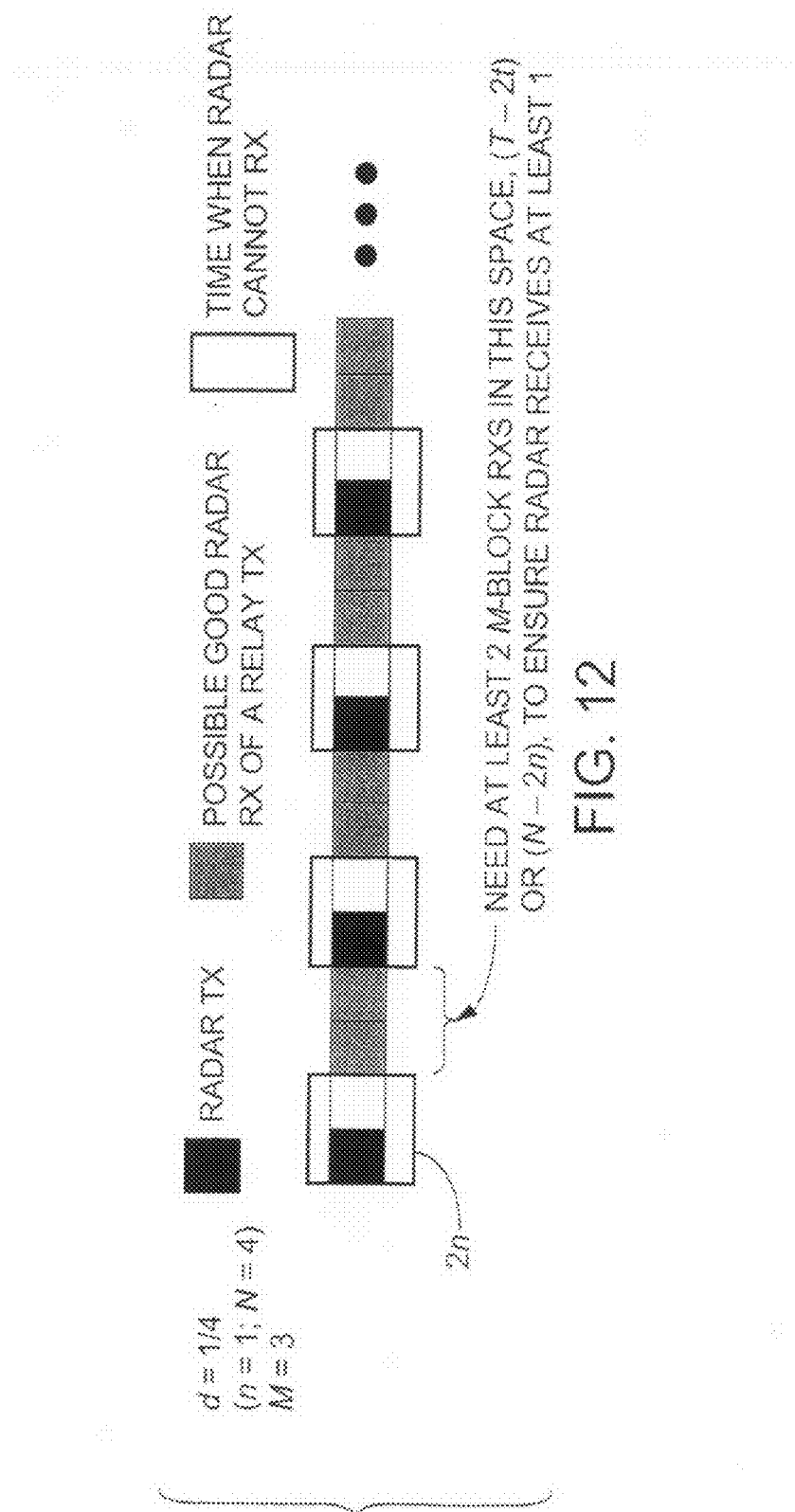
FIG. 12 shows the exemplary radar-relay system of FIG. 11B.
Figure 13:
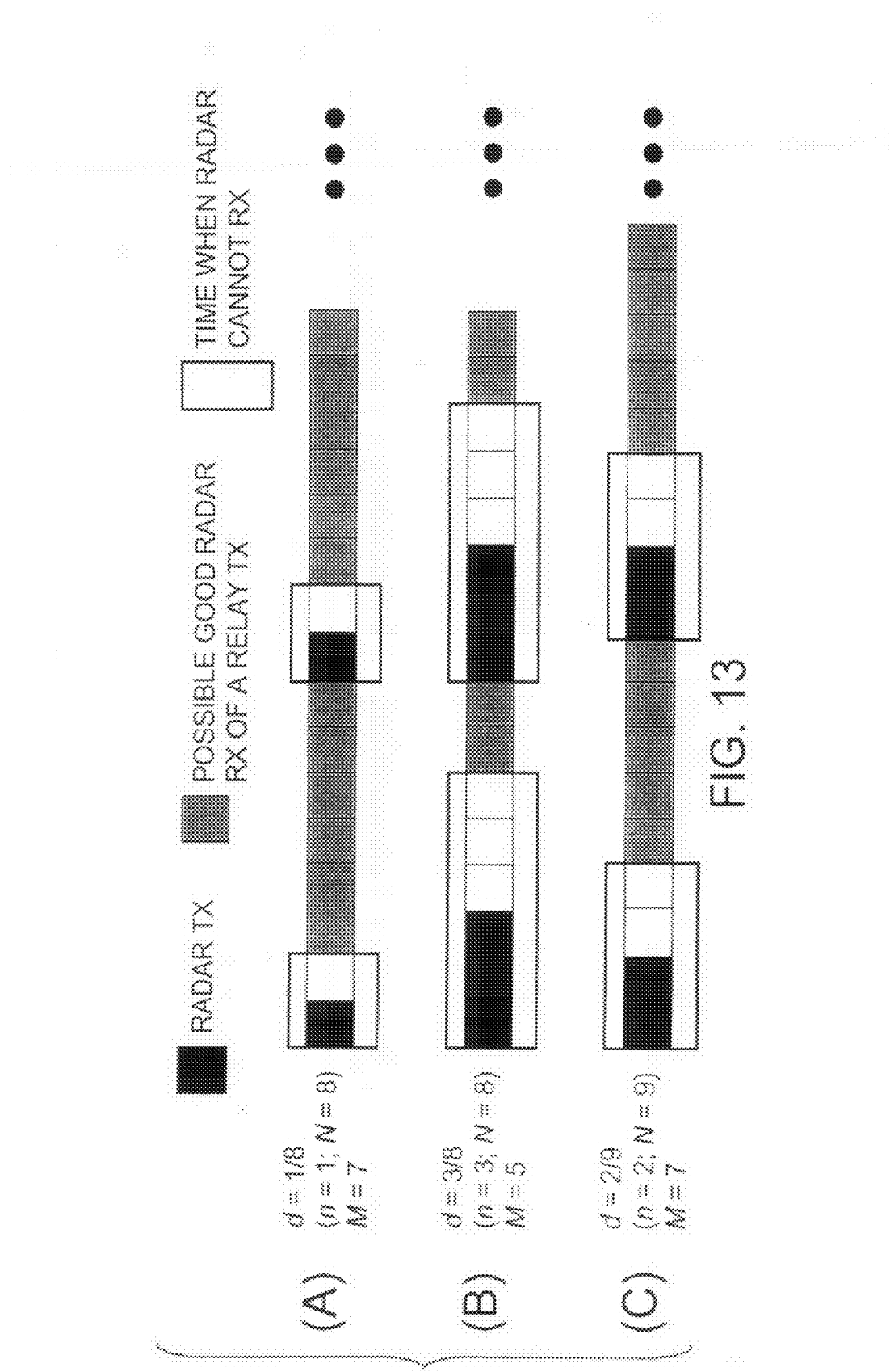
FIGS. 13A, 13B and 13C depict three exemplary commonly-scaled cases for duty cycles (d) of $\frac{1}{8}$, $\frac{3}{8}$ and $\frac{2}{8}$, respectively.
Figure 14:
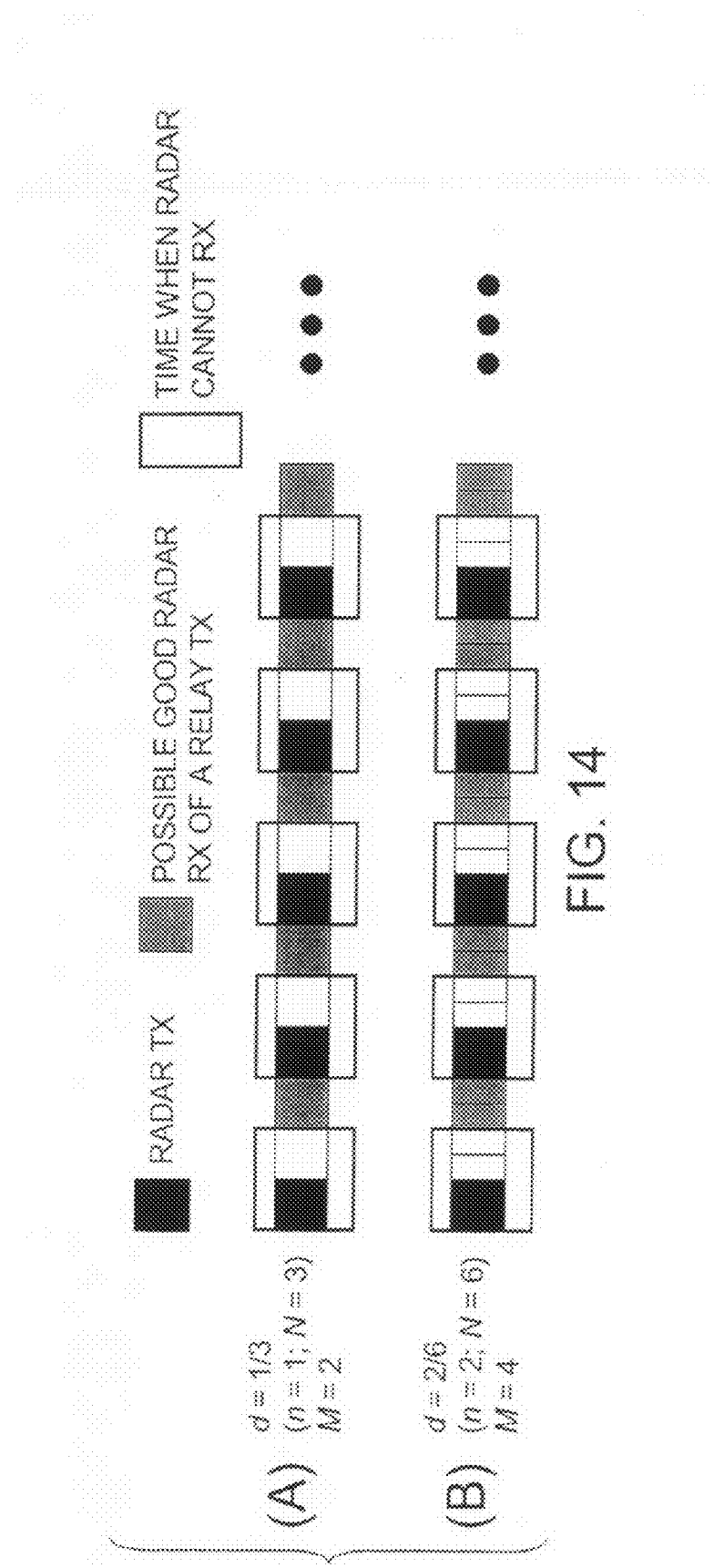
FIG. 14A illustrates the exemplary commonly-scaled case for a duty cycle (d) of $\frac{1}{3}$.
FIG. 14B depicts the exemplary commonly-scaled case for a duty cycle (d) of $\frac{2}{6}$.
Figure 15:
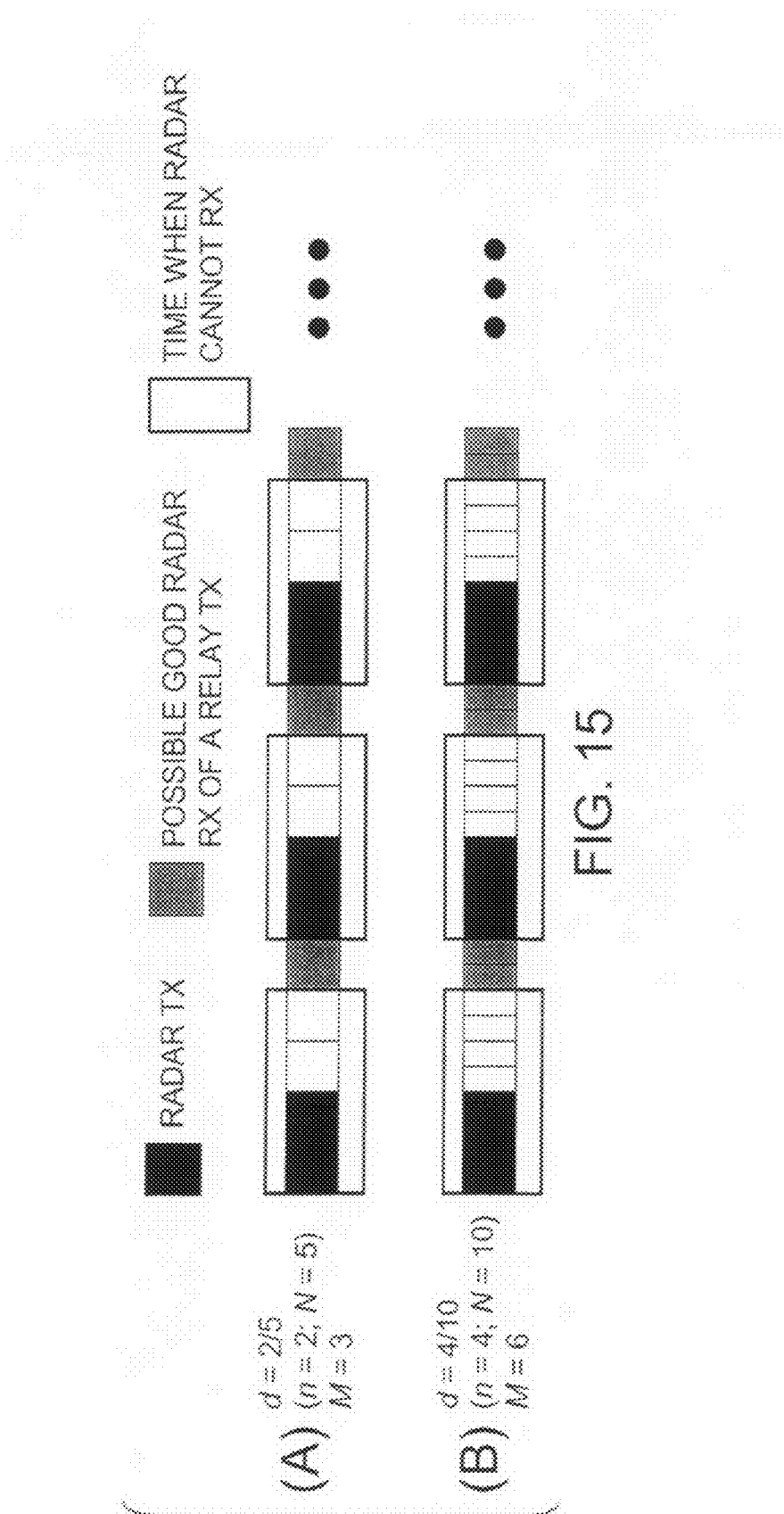
FIGS. 15A and 15B depict exemplary commonly-scaled cases for duty cycles (d) of $\frac{2}{5}$ and $\frac{4}{10}$, respectively.

Furthermore, based on the above-presented discussions of FIGS. 11 and 12, it should be apparent that a given combination of n, N and M may be suitable for use with aspects of the exemplary embodiments of the invention provided at least two relay transmissions (e.g. M-blocks) can be received by the radar in a time T−2t, as shown in FIG. 12. Also note that, although shown in FIG. 12 as one contiguous period of time, the portion of the period for which the radar cannot receive may be divided into one or more separate pieces, as shown in FIG. 11C, for example. This is also the reason why at least two relay transmissions should be received by the radar in a time T−2t. One of the at least two relay transmissions may be corrupted due to propagation delays and phase shifts, for example. In such a case, and as shown in FIG. 11C, the other (i.e. "second") received relay transmission will be received in its entirety.

One additional constraint becomes apparent based on the third criterion. The duty cycle of the radar must be less than 50% (d<50%). For example, if the duty cycle were greater than or equal to 50%, then the time T−2t becomes problematic (i.e. T−2t≦0) since the time 2t would be greater than or equivalent to the time T. Thus, if d≧50%, there is an insufficient amount of time available for the radar to receive relay transmissions.

One further constraint based on the third criterion is that M≧3. Since a portion of the potential radar reception time may be unavailable due to the blanking of the relay transmitter (see, e.g. FIGS. 11B and 11C), at least one relay transmission may be affected (e.g. corrupted). Furthermore, as noted above, the size of the time period T−2t should be large enough to receive at least two relay transmissions. Thus, the relay should transmit at least three times (M≧3) to ensure that the radar will receive at least one relay transmission.

It is noted that since n and N may be considered as a scale for t and T (see, e.g. equations (1) and (2) above), as used herein the term T−2t may also be referred to as N−2n when referring to the N intervals into which the period T may be divided (e.g. by the radar).

Given the above, there are some unsuitable cases (e.g. sets of values for n, N and M) that may not be utilized with aspects of the exemplary embodiments of the invention. It should be apparent that, for a given N, most cases are suitable, particularly those cases having a relatively small n. FIGS. 13A, 13B and 13C depict three exemplary commonly-scaled cases for duty cycles (d) of ⅛, ⅜ and ⅖, respectively. As long as there are at least two possible good radar receptions (RX) of relay transmissions (TX) in the time period T−2t, the case is considered suitable. In FIGS. 13A, 13B and 13C, there are six, two and five possible good radar RX of relay TX, respectively. Clearly, each of these three exemplary cases is suitable.

One group of cases which are herein considered unsuitable comprise duty cycles (values of d) having an odd N and the highest allowable value of n given that d<50%. For example, duty cycles of ⅓, ⅖ and 4/9 fall into this group of cases. FIG. 14A illustrates the exemplary commonly-scaled case for a duty cycle (d) of ⅓. As can be seen, only one relay transmission can be received by the radar in the time period T−2t instead of the desired at least two relay transmissions.

One way to address this particular group of cases lies in the use of scale as relating to values of n and N for a given duty cycle (d). FIG. 14B depicts the exemplary commonly-scaled case for a duty cycle (d) of ⅔. In FIG. 14B, one can see that, unlike the case shown in FIG. 14A, two relay transmissions can be received by the radar in the time period T−2t and, thus, the exemplary case shown in FIG. 14B is suitable.

As can be appreciated, the duty cycles of FIGS. 14A and 14B are effectively the same (d=33.33%). However, by changing the values of n, N and M from those of FIG. 14A to those of FIG. 14B, one can obtain a suitable combination that may be used in accordance with aspects of the exemplary embodiments of the invention. Note that FIG. 14B is only one example of a suitable combination of values for n, N and M that may be utilized for a duty cycle (d) of 33.33%. As non-limiting examples, other suitable values of n and N for d=33.33% include ⅜ and 4/12. In these examples, and as shown in FIGS. 14A and 14B, the values of n and N have been scaled based on the given duty cycle, d=33.33%.

By way of further example, FIGS. 15A and 15B depict exemplary commonly-scaled cases for duty cycles (d) of ⅖ and 4/10, respectively. One can see that the exemplary case shown in FIG. 15A is unsuitable whereas the exemplary case shown in FIG. 15B is suitable.

One can expand upon these concepts to provide further improvement on some aspects of the exemplary embodiments of the invention by utilizing diversely-scaled arrangements when possible.

FIGS. 16A, 16B and 16C depict three exemplary cases for a duty cycle (d) of 3/14. In FIG. 16A, N and M are commonly-scaled. Thus, since 3 (n) of the 14 (N) intervals in each period are used by the radar for transmission, there are 11 (N−n) intervals available for reception. The relay transmits the same message 11 times (M=11). As apparent from FIG. 16A, at least two of the 11 relay transmissions will be received by the radar in the time interval T−2t.

Unlike FIG. 16A, FIGS. 16B and 16C depict diversely-scaled arrangements. In FIG. 16B, the duty cycle (d=3/14) and relative portion of each period during which the radar may not receive a relay transmission remain the same as in FIG. 16A. However, the scale of the relay transmissions, and thus the number of relay transmissions (M), is different from that shown in FIG. 16A. Whereas the relay of FIG. 16A transmitted 11 times (M=11) in the available period (i.e. the time during which the relay transmitter is not blanked, T−t), the relay of FIG. 16B transmits 5 times (M=5) in the same time period. As can be seen in FIG. 16B, even though the number of relay transmissions has decreased, at least two of the relay transmissions can be received by the radar in the time T−2t. Thus, the arrangement of FIG. 16B still comprises a suitable arrangement capable of being used in accordance with aspects of the exemplary embodiments of the invention.

Further note that since the relay of FIG. 16B transmits fewer times in the same time interval as compared with the relay of FIG. 16A, a single relay transmission in FIG. 16B is longer (e.g. larger) than a single relay transmission of FIG. 16A. In such a manner, the throughput of the relay transmissions in FIG. 16B is greater than the throughput of the relay transmission in FIG. 16A. Accordingly, the data rate in FIG. 16B may be greater as well. This improvement in throughput is significant as it enables the relay to transmit more data and/or transmit a same amount of data faster. Based on this, it is likely that the exemplary arrangement shown in FIG. 16B will be considered preferable to the exemplary arrangement shown in FIG. 16A.

FIG. 16C shows a further improvement that may be possible over the exemplary system of FIG. 16B. In FIG. 16C, the relay transmits 3 times (M=3) in the available period. Even though this is the minimum number of relay transmissions (recall, M≧3), as can be seen in FIG. 16C, at least two relay transmissions can be received in the time T−2t and, thus, the system in FIG. 16C is also suitable.

As noted above, a higher throughput may be preferable. Thus, the system shown in FIG. 16C may be preferable over the systems shown in FIGS. 16A and 16B due to its higher throughput. Furthermore, it may be desirable to provide the lowest number of relay transmissions (M) since the size (i.e. length, duration) of an individual relay transmission increases as M decreases. Of course, this goal should be achieved in light of the various constraints identified and discussed above.

Based on the above-stated goal of providing the lowest number of relay transmissions (the smallest M) in light of the various conditions, it may be desirable to consider a method for determining possible values of M (e.g. the lowest allowable value of M) based on given values of n and N. Note that since the duty cycle (d) may be expressed as a fraction or converted to one, it is trivial to further consider a method for determining possible values of M based on a given duty cycle (d). Although one could attempt to derive the allowable values of M based on to-scale diagrams similar to those in FIGS. 11-16, it is likely impractical to perform such graphing for every desired or possible combination of n and N, especially if an equation or other relationship can provide comparable guidance.

As an initial assumption, it will be assumed that the upper bound for M corresponds to the commonly-scaled system. That is, it will be assumed that the length of an individual relay transmission (i.e. an interval of M) will not be smaller than an individual interval of N. Since the goal is to increase throughput by reducing the number of relay transmissions (M), thus increasing the size of an individual relay transmission (an interval of M), this appears to be a reasonable upper bound. This assumption further indicates that the upper bound for M corresponds to the M-value in the commonly-scaled arrangement. In the commonly-scaled system, M=N−n since the scales for M and N are the same or substantially similar. Thus, at least for purposes of convenience, the upper bound of M will be considered as N−n.

It is noted that in other embodiments, the upper bound of M may be a value greater than N−n.

In order to derive a relationship between M and given values of n and N, consider an exemplary radar-relay system utilizing aspects of the exemplary embodiments of the invention, wherein the radar duty cycle (d) is 5/14. That is, for this exemplary system, n=5 and N=14. As noted above, the upper bound for M is considered to be N−n or, in this case, M≦9.

Figure 16:
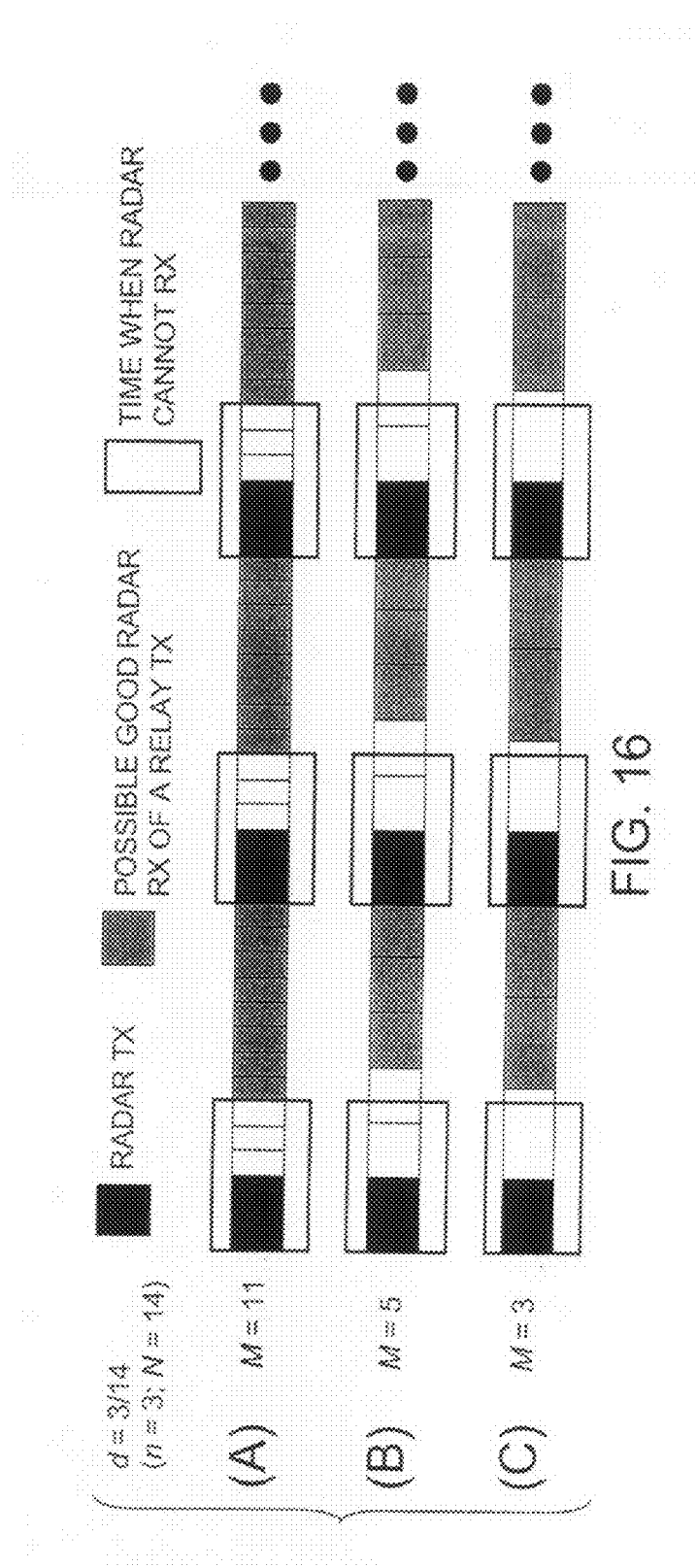
FIGS. 16A, 16B and 16C depict three exemplary cases for a duty cycle (d) of $\frac{3}{14}$.
Figure 17:
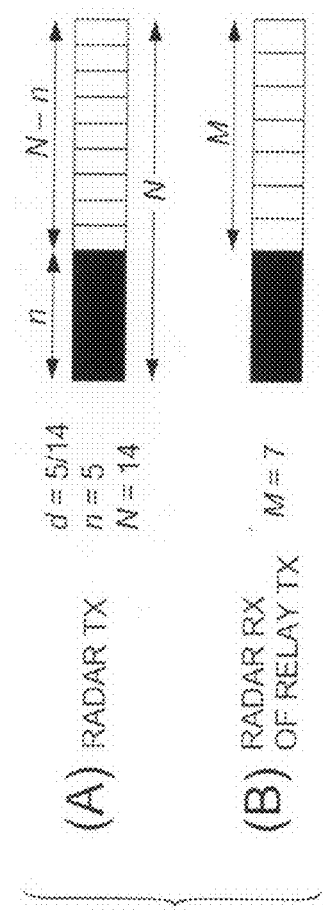
FIGS. 17A and 17B illustrate exemplary radar transmission and radar reception of relay transmissions for $d=\frac{5}{14}$ and $M=7$, respectively.

Based on the above discussion, and as can be seen in FIG. 16, the lower bound for M will correspond to a diversely-scaled system. Thus, one should consider how to convert between the two scales (i.e. between the scale for N and the scale for M).

Further to the example of d=5/14, for explanation purposes, assume that an allowable value for M is M=7. FIGS. 17A and 17B illustrate exemplary radar transmission and radar reception of relay transmissions for d=5/14 and M=7, respectively. As can be seen by comparing FIG. 17A and 17B, the M relay transmissions should fit within the time period of N−n intervals. This is at least partially due to the blanking of the relay transmitter in accordance with the received radar transmission.

Since the M relay transmissions and N radar intervals utilize different scales, one should distinguish between the two scales. As such, let a subscript letter indicate the respective scale for the value. For example, $5_m$ corresponds to a length (e.g. time or duration) of 5 M-intervals.

Using this notation, one begins with the relation of equation (3):

$$(N-n)_n = M_m \quad (3)$$

Based on the example of d=5/14 and M=7, one knows:

$$(N-n)_n = 9_n \quad (4)$$

$$M_m = 7_m \quad (5)$$

By substituting equations (4) and (5) for the respective portions of equation (3), one has:

$$9_n = 7_m \quad (6)$$

Solving for $1_n$, one obtains:

$$1_n = \left(\frac{7}{9}\right)_m \quad (7)$$

This conversion appears to make sense, especially when one considers FIGS. 17A and 17B which show that a single interval of N is smaller than a single interval of M. Furthermore, based on the different scales, if one normalizes to the N scale (i.e. solves for an interval of N in terms of M, as in equation (7)), the conversion should be a ratio based on the corresponding number of intervals for a same time period (e.g. T−t or N−n).

Generalizing equation (7) (i.e. for any value of n, N and M), one obtains:

$$1_n = \left(\frac{M}{N-n}\right)_m \quad (8)$$

Equation (8) enables conversions between the different scales of M and N. This conversion can be further utilized to determine a relation for the lower bound of M as follows.

The third criterion from the above discussions states that at least two repeated relay messages should be received at the radar in a time interval T−2t (i.e. N−2n) to ensure that at least one complete relay message is received by the radar. That is, one should have at least 2 M-blocks (i.e. at least 2 relay transmissions) in the time period N−2n to ensure reception by the radar of at least 1 M-block (i.e. at least 1 relay transmission).

Figure 18:
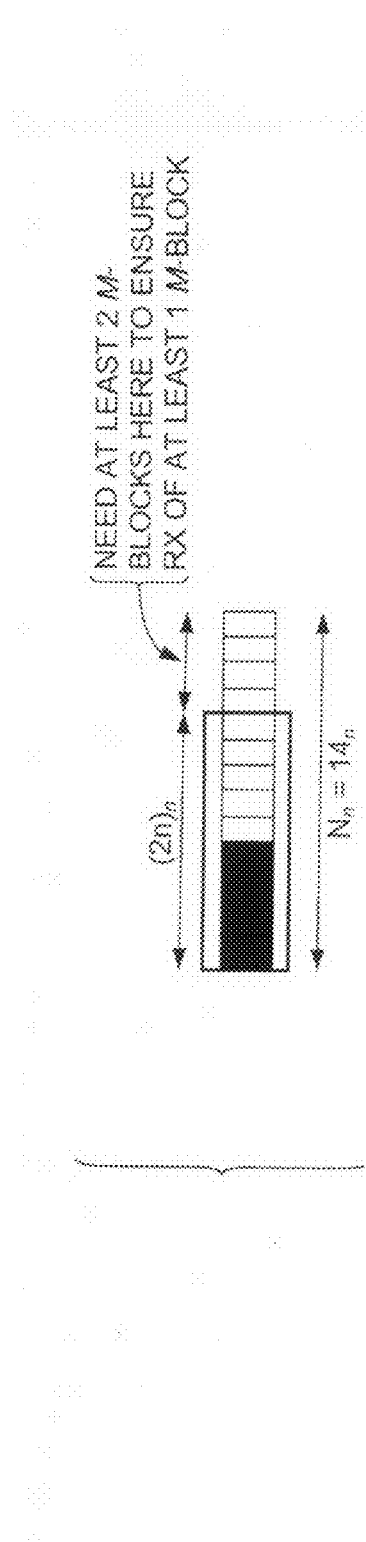
FIG. 18 illustrates the third criterion in relation to the exemplary system wherein the radar duty cycle (d) is $\frac{5}{14}$.
Figure 22:
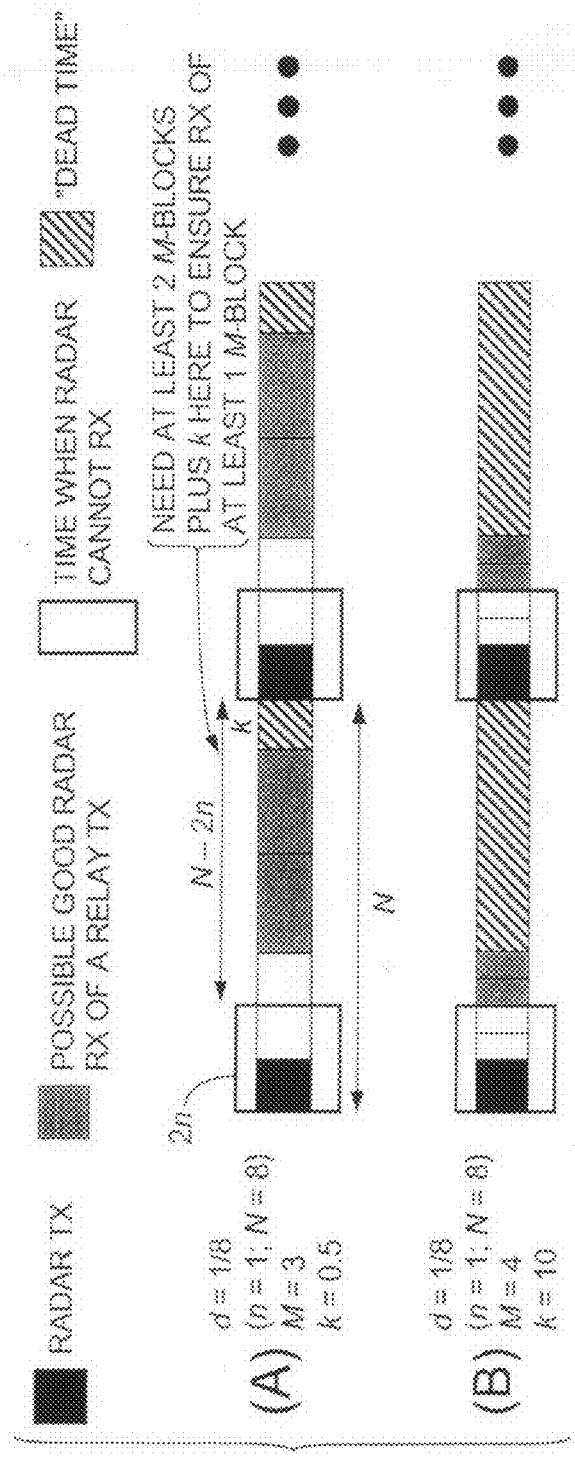
FIGS. 22A and 22B depict exemplary transmission/reception diagrams with different values of M and k for an exemplary radar-relay system having a radar duty cycle (d) of 1/8.
Figure 19:
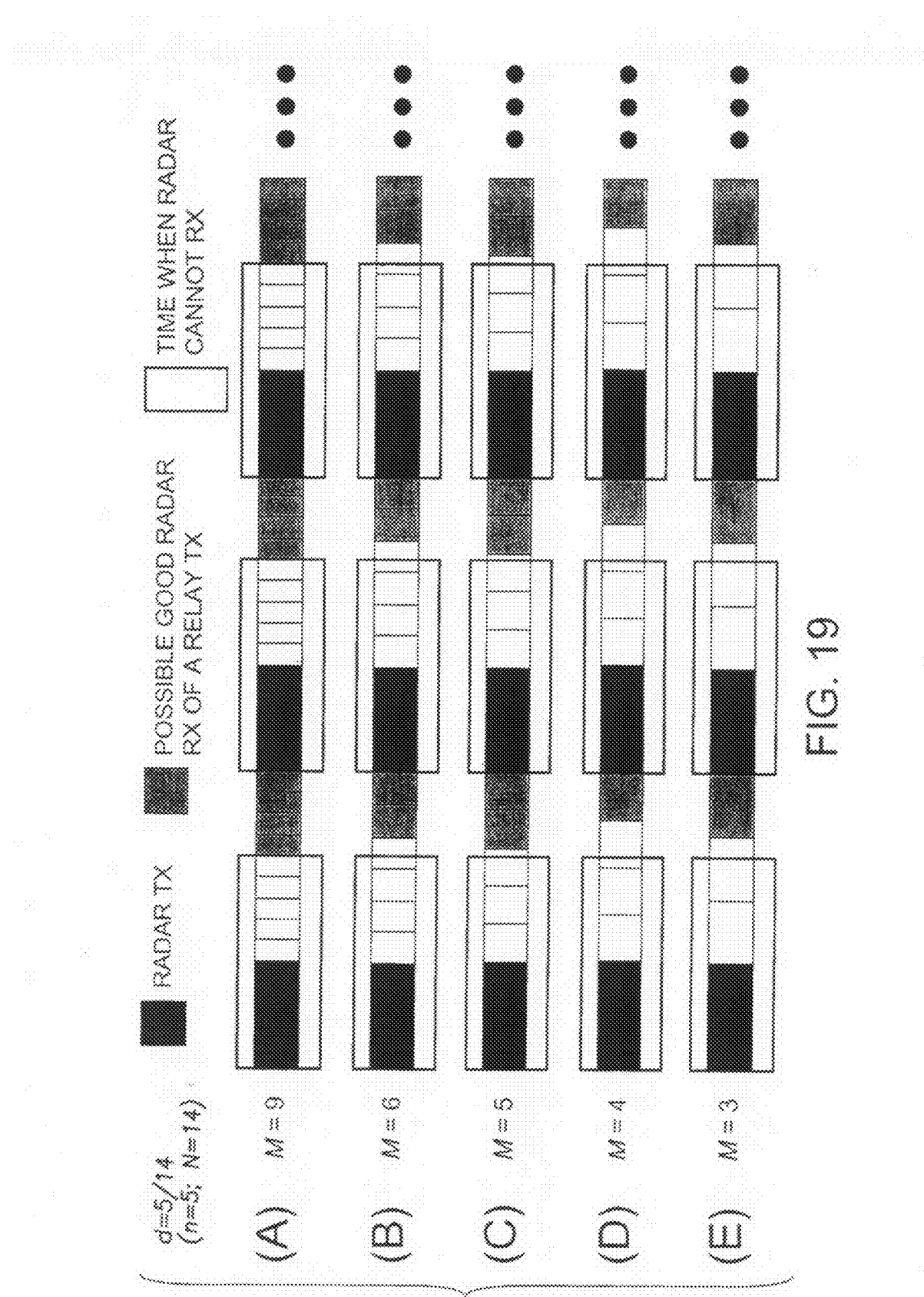
FIGS. 19A-19E shows exemplary transmission/reception diagrams with different values of M for an exemplary radar-relay system having a radar duty cycle (d) of $\frac{5}{14}$.

FIG. 18 illustrates the third criterion in relation to the exemplary system described above wherein the radar duty cycle (d) is 5/14. Since the radar may not be able to receive relay transmissions for up to 2n intervals in each period of N intervals, one should ensure that at least 2 relay transmissions (at least 2 M-blocks) can be received by the radar (e.g. "fit") in the remaining time period of N−2n.

The third criterion, as depicted in FIG. 18, can be expressed as:

$$(N-2n)_n \geq 2 \quad (9)$$

Equation (9) can be expanded to:

$$(N-n)_n - n \geq 2_m \quad (10)$$

One can substitute in equation (10) based on equation (3) to obtain:

$$M_m - n_n \geq 2_m \quad (11)$$

Equation (11) can be expanded to:

$$M_m - (n \times 1_n) \geq 2_m \quad (12)$$

One can substitute equation (8) into equation (12) and obtain:

$$M_m - n\left(\frac{M}{N-n}\right)_m \geq 2_m \quad (13)$$

Since all of the terms in equation (13) are in M-units (i.e. expressed in relation to the M-scale), one can drop the subscripts. This gives the relation:

$$M - \frac{Mn}{N-n} \geq 2 \quad (14)$$

Thus, the lower bound of M is the smallest M that satisfies equation (14). This may be utilized in light of the above-stated provision that M≧3.

Consider equation (14) as applied to various values of M in the above-presented example of d=5/14 (n=5; N=14; N−n=9). M=7 gives:

$$7 - \frac{7 \times 5}{14-5} = 7 - \frac{35}{9} = 7 - 3.88 = 3.12 > 2 \quad (15)$$

Thus, M=7 is an allowable value for M. To continue onwards and determine the lower bound for M in d=5/14, continue testing values of M until the lowest allowable value of M is found.

Accordingly, M=6 gives:

$$6 - \frac{6 \times 5}{14-5} = 6 - \frac{30}{9} = 6 - 3.33 = 2.67 > 2 \quad (16)$$

Next, M=5 yields:

$$5 - \frac{5 \times 5}{14-5} = 5 - \frac{25}{9} = 5 - 2.78 = 2.22 > 2 \quad (17)$$

Further, M=4 gives:

$$4 - \frac{4 \times 5}{14-5} = 4 - \frac{20}{9} = 4 - 2.22 = 1.78 < 2 \quad (18)$$

As can be seen, M=5 is an allowable value whereas M=4 is not. Thus, M=5 is the lowest allowable value for M in this exemplary system where d=5/14. That is, the allowable values for M with d=5/14 are:

$$5 \leq M \leq 9 \quad (19)$$

Generalizing equation (19) yields the relation: (the lowest value of M that satisfies $$M - \frac{Mn}{N-n} \geq 2) \leq M \leq (N-n) \quad (20)$$

Thus, for given values of n and N that satisfy the constraints previously stated and discussed (e.g. d<50%), equation (20) gives the potential values of M. Also as noted above, it is likely that the smallest value of M will be the most desirable to use because, for example, it provides the fewest number of relay transmissions (i.e. retransmissions), thus reducing unnecessary transmissions. As another example of why the smallest value of M may be the most desirable one, it also provides the largest allowable size of M-blocks (i.e. the largest allowable size of an individual relay transmission), thus also yielding the highest allowable throughput (e.g. data rate).

FIGS. 19A-19E show exemplary transmission/reception diagrams with different values of M for an exemplary radar-relay system having a radar duty cycle (d) of 5/14. FIGS. 19A, 19B, 19C, 19D and 19E depict the use of various values for M, namely 9, 6, 5, 4 and 3, respectively. As can be seen, M=5 is the lowest value of M for which 2 relay transmissions can be received by the radar in a time period N−2n. Thus, for d=5/14, the lower bound of M is 5. The diagrams shown in FIGS. 19A-19E, assuming they are to scale, confirm the results shown above in equations (15)-(19).

Note that in some exemplary embodiments of the invention, it may be desirable to utilize a commonly-scaled arrangement instead of a diversely-scaled arrangement, for example, due to additional processing incurred by or components required for a diversely-scaled arrangement. In such a case, the value of M may not be optimized to provide the highest throughput. Furthermore, in such a case, M=N−n since that is the value of M that corresponds to the commonly-scaled system.

In the above discussions of n, N and M, an additional, previously-unstated assumption is that the relay transmissions for a given period, considered collectively, fill the entirety or a substantial portion of the available relay transmitter time (i.e. the portion of each period for which the relay is not blanked). In other embodiments, the relay transmissions for a given period may not entirely or substantially fill the available relay transmitter time. In such a case, the relay may have or add an additional portion of "dead time" to the relay transmission pattern. While this may inhibit the use of or reliance on equation (20), for example, other constraints, including the third criterion, still hold.

Note that the "dead time" is herein considered to comprise one or more portions of available relay transmitter time that are not used for transmission by the relay. The dead time may be generated by components in the relay (e.g. to provide additional cooling time for the relay transmitter) or created by one or more external influences, as non-limiting examples.

In further consideration of a "dead time" relay transmission pattern, assume that a relay transmission includes a time interval of length (e.g. duration or time) k, wherein k is measured in terms of the M-scale (i.e. k may be written $k_m$ using the above-identified notation for scale). FIGS. 20A and 20B illustrate exemplary radar transmission and radar reception of relay transmissions for d=5/14 and M=7, respectively, where the relay transmission pattern has a "dead time" k. Note that FIG. 20 parallels FIG. 17, described above. Further note that based on FIG. 20, one can see that:

$$(N-n)_n = M_m + k_m \quad (21)$$

One can also obtain:

$$1_n = \left( \frac{M+k}{N-n} \right)_m \quad (22)$$

Equations (21) and (22) parallel equations (3) and (8), respectively.

Note that FIGS. 20A and 20B are merely used for illustration. That is, it is not suggested or posited that the system shown in FIGS. 20A and 20B comprises a suitable system or an allowable value of M for the given duty cycle of d=5/14.

FIG. 21 illustrates the third criterion in relation to the exemplary system described above wherein the radar duty cycle (d) is 5/14 and where the relay transmission pattern has a "dead time" k. As can be appreciated, since the radar may not be able to receive relay transmissions for up to 2n intervals in each period of N intervals, one should ensure that at least 2 relay transmissions (at least 2 M-blocks) plus the dead time (k) can be received by the radar (e.g. "fit") in the remaining time period of N−2n.

The third criterion, as depicted in FIG. 18, can be expressed as:

$$(N-2n)_n \geq 2_m + k_m \tag{23}$$

Equation (23) parallels equation (9). Similar to the above-described derivation that begins with equation (9) and uses equations (10)-(13) in order to obtain equation (14), one can undertake a similar derivation based on equation (23) and utilize equations (21) and (22) to proceed in a similar manner and obtain:

$$M - \frac{M+k}{N-n} n \geq 2 \tag{24}$$

Equation (24) parallels equation (14) and correctly accounts for the dead time k. As stated above, note that the value for k, as used in equation (24) and elsewhere, should be expressed in terms of the M-scale. If k is given in terms of the N-scale, the value should be converted to the M-scale for use in equation (24).

Similar to equation (20), the bound of M in a system whose relay transmission pattern has one or more dead times of length $k_m$ can be expressed as:

(the lowest value of M that satisfies $$M - \frac{M+k}{N-n} n \geq 2) \leq M \tag{25}$$

Thus, equation (25) provides guidance for the lower bound of M in a system whose relay transmission pattern has one or more "dead times." Unlike the non-dead time relay transmission pattern, depending on the size of k, in a dead time relay transmission pattern, the upper bound of M may be a value greater than N−n. Furthermore, in some cases, in a dead time relay transmission pattern, the lower bound of M may be a value greater than N−n. The value of M is highly dependent on the size of the dead time k.

FIGS. 22A and 22B depict exemplary transmission/reception diagrams with different values of M and k for an exemplary radar-relay system having a radar duty cycle (d) of ⅛. FIG. 22A shows a diagram for d=⅛ with M=3 and k=0.5. FIG. 22B shows a diagram for d=⅛ with M=4 and k=10. The two systems shown in FIGS. 22A and 22B both comprise suitable, non-limiting, exemplary arrangements that may be utilized in accordance with aspects of the exemplary embodiments of the invention.

As one non-limiting example where it may be desirable to utilize a form of dead time, consider FIG. 22B. In FIG. 22B, there is a significant amount of dead time. During that dead time, if the relay were in communication with a second station (i.e. a station or entity other than the radar), the relay could transmit to the second station during the dead time. Note that there may be additional problems or conditions in such a situation. For example, if the second station were only able to perform one of transmitting or receiving at a given instant of time (e.g. similar to the radar as described herein), the relay would likely need to know the duty cycle of the second station in order to send an allowable number (M) and size of trans-missions. As another example, it is likely that such an arrangement would not be conducive to the relay receiving multiple transmissions from multiple stations since the multiple relay receptions could potentially overlap in time. The precise nature and/or use of the dead time is not further considered beyond the above-described aspects as relating to the radar-relay communications described herein with respect to the exemplary embodiments of the invention.

In some exemplary embodiments, the relay knows the timing (e.g. the duty cycle) of the radar a priori. In other exemplary embodiments, an acquisition transmission is sent to the relay. As non-limiting examples, the acquisition transmission may include the duty cycle of the radar and/or transmission duration parameters.

Although described above with respect to airborne platforms (e.g. FIGS. 1 and 2), the exemplary embodiments of the invention may be utilized in conjunction with any suitable electronic communications device, including a mobile device, a mobile platform and a waterborne platform, as non-limiting examples.

Figure 23:
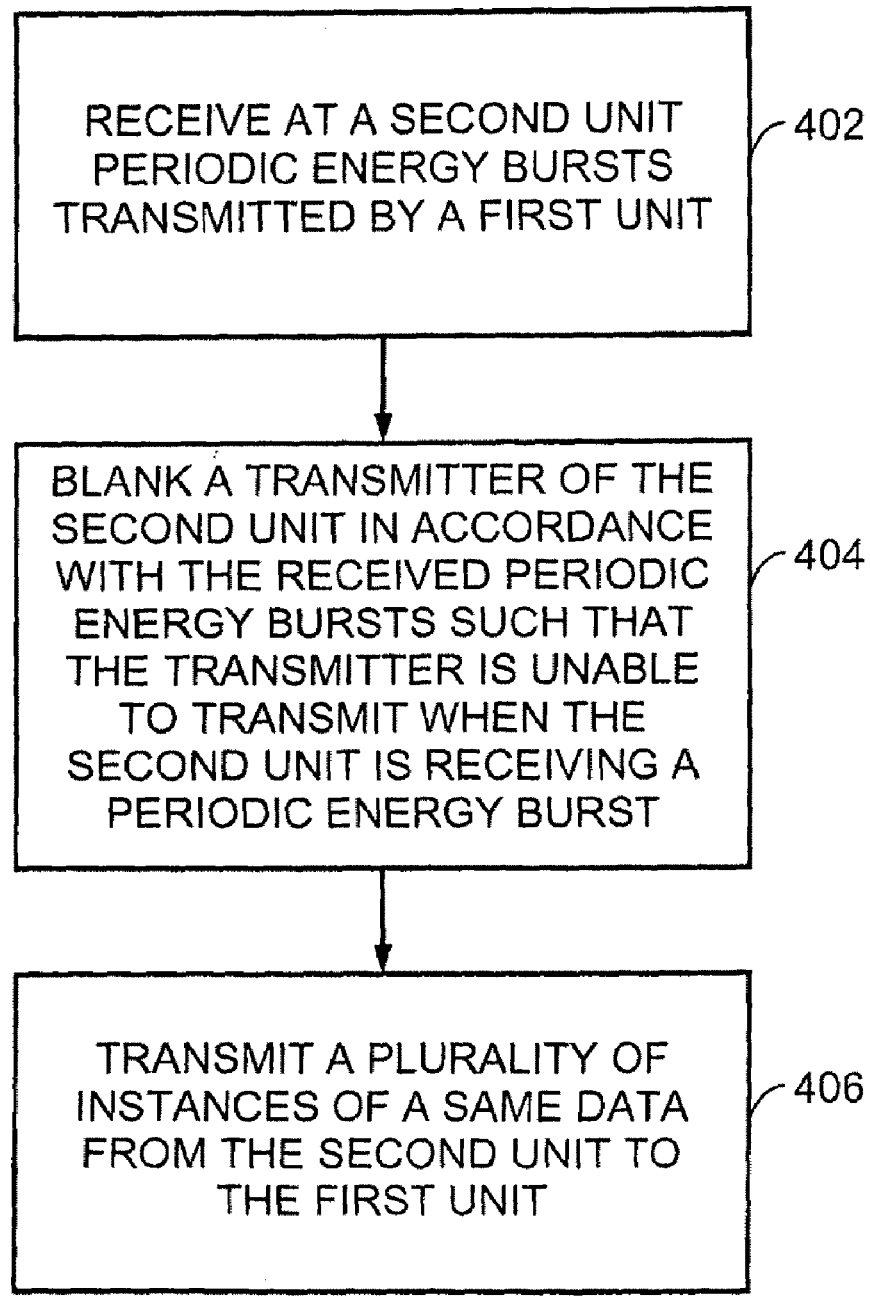
FIG. 23 depicts a flowchart illustrating one non-limiting example of a method for practicing the exemplary embodiments of the invention.

FIG. 23 depicts a flowchart illustrating one non-limiting example of a method for practicing the exemplary embodiments of the invention. The steps of the exemplary method of FIG. 23 include: receive at a second unit periodic energy bursts transmitted by a first unit (box 402); blank a transmitter of the second unit in accordance with the received periodic energy bursts such that the transmitter is unable to transmit when the second unit is receiving a periodic energy burst (box 404); and transmit a plurality of instances of a same data from the second unit to the first unit (406).

In other embodiments, transmitting the plurality of instances comprises transmitting in between consecutive ones of the received periodic energy bursts. In further embodiments, blanking the transmitter of the second unit comprises: generating a blanking pulse timed in accordance with the received periodic energy bursts and; utilizing the generated blanking pulse to blank the transmitter of the second unit. In other embodiments, the periodic energy bursts and the plurality of instances are both transmitted on a common frequency band. In further embodiments, the periodic energy bursts comprise radar bursts. In other embodiments, the plurality of instances comprises at least three instances. In further embodiments, the transmission of the periodic energy bursts by the first unit comprises a duty cycle indicative of a ratio of on-time to off-time for said transmission of the periodic energy bursts and a number of the plurality of instances is determined based on at least said duty cycle.

As shown above in conjunction with discussions of the exemplary embodiments of the invention, a data pulse synchronization method is utilized that permits precise gating of a transmitted signal given the location of the synchronization pulse in the received signal. The exemplary embodiments of the invention enable spectrum time-sharing such that simpler transmit and receive signal filter implementation with associated cost and weight reductions may be employed. The spectrum time-sharing further permits lower bandwidth utilization when compared to conventional full-duplex implementations. Similarly, a higher data rate capacity for both transmitted and received signals is provided.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving at a second unit periodic energy bursts transmitted by a first unit;
   blanking a transmitter of the second unit in accordance with the received periodic energy bursts such that the transmitter is unable to transmit when the second unit is receiving a periodic energy burst; and
   transmitting, in between consecutive ones of the received periodic energy bursts, a plurality of instances of a same data from the second unit to the first unit.

2. The method of claim 1, wherein blanking the transmitter of the second unit comprises:
   generating a blanking pulse timed in accordance with the received periodic energy bursts and;
   utilizing the generated blanking pulse to blank the transmitter of the second unit.

3. The method of claim 1, wherein the periodic energy bursts and the plurality of instances are both transmitted on a common frequency band.

4. The method of claim 1, wherein the periodic energy bursts comprise radar bursts.

5. The method of claim 1, wherein the plurality of instances comprises at least three instances.

6. The method of claim 1, wherein the transmission of the periodic energy bursts by the first unit comprises a duty cycle indicative of a ratio of on-time to off-time for said transmission of the periodic energy bursts, wherein a number of the plurality of instances is determined based on at least said duty cycle.

7. A computer-readable medium embodying program instructions, execution of the program instructions by an electronic device resulting in operations comprising:
   receiving at a second unit periodic energy bursts transmitted by a first unit;
   blanking a transmitter of the second unit in accordance with the received periodic energy bursts such that the transmitter is unable to transmit when the second unit is receiving a periodic energy burst; and
   transmitting, in between consecutive ones of the received periodic energy bursts, a plurality of instances of a same data from the second unit to the first unit.

8. The computer-readable medium of claim 7, wherein blanking the transmitter of the second unit comprises:
   generating a blanking pulse timed in accordance with the received periodic energy bursts and;
   utilizing the generated blanking pulse to blank the transmitter of the second unit.

9. The computer-readable medium of claim 7, wherein the periodic energy bursts and the plurality of instances are both transmitted on a common frequency band.

10. The computer-readable medium of claim 7, wherein the periodic energy bursts comprise radar bursts.

11. The computer-readable medium of claim 7, wherein the plurality of instances comprises at least three instances.

12. The computer-readable medium of claim 7, wherein the transmission of the periodic energy bursts by the first unit comprises a duty cycle indicative of a ratio of on-time to off-time for said transmission of the periodic energy bursts, wherein a number of the plurality of instances is determined based on at least said duty cycle.

13. An electronic device comprising:
   a receiver configured to receive periodic energy bursts transmitted by another electronic device;
   a transmitter configured to transmit, in between consecutive ones of the received periodic energy bursts, a plurality of instances of a same data to the other electronic device; and
   a data processor coupled to the receiver and the transmitter, wherein the data processor is configured to blank the transmitter in accordance with the periodic energy bursts received by the receiver such that the transmitter is unable to transmit when the receiver is receiving a periodic energy burst.

14. The electronic device of claim 13, wherein the data processor is configured to blank the transmitter by generating a blanking pulse timed in accordance with the periodic energy bursts received by the receiver and to utilize the generated blanking pulse to blank the transmitter.

15. The electronic device of claim 13, wherein the periodic energy bursts and the plurality of instances are both transmitted on a common frequency band.

16. The electronic device of claim 13, wherein the periodic energy bursts comprise radar bursts.

17. The electronic device of claim 13, wherein the plurality of instances comprises at least three instances.

18. The electronic device of claim 13, wherein the transmission of the periodic energy bursts by the other electronic device comprises a duty cycle indicative of a ratio of on-time to off-time for said transmission of the periodic energy bursts, wherein a number of the plurality of instances is determined based on at least said duty cycle.

19. The electronic device of claim 13, wherein the electronic device comprises a mobile electronic device.

20. The electronic device of claim 13, embodied on a mobile platform.

21. The electronic device of claim 13, embodied on an airborne platform.

22. The electronic device of claim 13, embodied on a waterborne platform.

23. A system comprising:
   a first electronic device comprising a first transmitter coupled to a first data processor and a first receiver coupled to the first data processor, wherein the first transmitter is configured to transmit periodic energy bursts; and
   a second electronic device comprising
      a second receiver configured to receive said periodic energy bursts,
      a second transmitter configured to transmit, in between consecutive ones of the received periodic energy bursts, a plurality of instances of a same data to the first electronic device, and
      a second data processor coupled to the second receiver and the second transmitter, wherein the second data processor is configured to blank the second transmitter in accordance with the periodic energy bursts received by the second receiver such that the second transmitter is unable to transmit when the second receiver is receiving a periodic energy burst.

24. The system of claim 23, wherein the first electronic device is configured such that the first receiver is unable to receive when the first transmitter is transmitting.

25. The system of claim 23, wherein the periodic energy bursts and the plurality of instances are both transmitted on a common frequency band.

* * * * *